US012694140B2

(12) United States Patent (10) Patent No.: US 12,694,140 B2
Tzabary et al. (45) Date of Patent: Jul. 28, 2026

(54) SYSTEM AND METHOD FOR SOFTWARE SERVICE POLICY EXCEPTION IN COMPUTING ENVIRONMENTS

(71) Applicant: Wiz, Inc., New York, NY (US)

(72) Inventors: Or Tzabary, Tel Aviv (IL); Ami Luttwak, Binyamina (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/913,346

(22) Filed: Oct. 11, 2024

(65) Prior Publication Data

US 2026/0105168 A1    Apr. 16, 2026

(51) Int. Cl.
| | |
|---|---|
| *G06F 21/62* | (2013.01) |
| *G06F 11/3668* | (2025.01) |
| *G06F 21/57* | (2013.01) |
| *H04L 9/40* | (2022.01) |

(52) U.S. Cl.
CPC ...... *G06F 21/6209* (2013.01); *G06F 11/3668* (2013.01); *G06F 21/577* (2013.01); *H04L 63/20* (2013.01)

(58) Field of Classification Search
CPC .. G06F 21/6209; G06F 11/3668; G06F 21/62; G06F 21/57; G06F 21/577; H04L 9/40; H04L 63/20
See application file for complete search history.

(56) References Cited

U.S. PATENT DOCUMENTS

| | | | |
|---|---|---|---|
| 4,757,533 A | 7/1988 | Allen et al. | |
| 8,881,288 B1 * | 11/2014 | Levy ..................... G06F 21/577 | |
| | | | 709/225 |

| | | | |
|---|---|---|---|
| 9,576,147 B1 * | 2/2017 | McClintock ........ G06F 21/6245 |
| 10,108,809 B2 * | 10/2018 | Panchapakesan ....... H04L 63/10 |
| 10,320,879 B2 | 6/2019 | Nekrestyanov et al. |
| 10,419,463 B2 | 9/2019 | Muddu et al. |
| 10,931,774 B2 | 2/2021 | Tal et al. |
| 10,999,312 B2 | 5/2021 | Viswambharan et al. |
| 11,595,372 B1 | 2/2023 | Sharifi Mehr |

(Continued)

FOREIGN PATENT DOCUMENTS

| | | | | |
|---|---|---|---|---|
| CN | 119449428 A | * | 2/2025 | ............. H04L 67/10 |
| WO | 2008091272 A2 | | 7/2008 | |

OTHER PUBLICATIONS

European Search Report and Opinion for EP 25176002.1 dated Sep. 12, 2025. European Patent Office, Munich, Germany.

*Primary Examiner* — Jayesh M Jhaveri
(74) *Attorney, Agent, or Firm* — M&B IP Analysts, LLC

(57) ABSTRACT

A system and method for managing a cybersecurity policy exception on a software service in a computing environment is presented. The method includes detecting a software service in a computing environment, the service including a code object and a resource; generating a representation of the software service in a security database, the security database further including a representation of the computing environment; applying a policy on the representation of the software service, the policy including a conditional rule; detecting a policy exception in response to applying the policy resulting in a policy fail of the conditional rule; determining that the software service passes the policy in response to applying the policy exception resulting in a pass; and initiating a remediation action, in response to determining that applying the policy exception results in a policy fail.

19 Claims, 15 Drawing Sheets

(56)                 References Cited

U.S. PATENT DOCUMENTS

| | | | |
|---|---|---|---|
| 11,750,643 B1 | 9/2023 | Imrem et al. | |
| 11,822,673 B2 | 11/2023 | Araujo et al. | |
| 11,972,027 B1 * | 4/2024 | Sanchez Rola | H04L 63/20 |
| 12,174,963 B1 * | 12/2024 | Alamuri | G06F 21/577 |
| 12,273,373 B1 | 4/2025 | Tzabary et al. | |
| 12,381,906 B1 | 8/2025 | Magriso et al. | |
| 12,443,722 B2 | 10/2025 | Herzberg et al. | |
| 12,524,550 B2 | 1/2026 | Herzberg et al. | |
| 2008/0201693 A1 | 8/2008 | Centonze et al. | |
| 2008/0244071 A1 | 10/2008 | Parupudi et al. | |
| 2008/0301765 A1 * | 12/2008 | Nicol | H04L 63/20 |
| | | | 726/1 |
| 2011/0047621 A1 | 2/2011 | Brando et al. | |
| 2015/0150081 A1 * | 5/2015 | Jaisinghani | H04L 63/0823 |
| | | | 726/1 |
| 2015/0193629 A1 * | 7/2015 | Hajost | H04L 9/0869 |
| | | | 713/189 |
| 2017/0242773 A1 | 8/2017 | Cirne et al. | |
| 2019/0318366 A1 | 10/2019 | Carranza et al. | |
| 2019/0377880 A1 | 12/2019 | Kolychev et al. | |
| 2020/0177617 A1 | 6/2020 | Hadar et al. | |
| 2020/0272743 A1 | 8/2020 | Song et al. | |
| 2020/0322359 A1 | 10/2020 | Burns et al. | |
| 2022/0188460 A1 | 6/2022 | Hadar et al. | |
| 2023/0161614 A1 | 5/2023 | Herzberg et al. | |
| 2023/0161869 A1 | 5/2023 | Herzberg et al. | |
| 2023/0161870 A1 | 5/2023 | Herzberg et al. | |
| 2023/0161871 A1 | 5/2023 | Heller et al. | |
| 2023/0164164 A1 | 5/2023 | Herzberg et al. | |
| 2023/0164174 A1 | 5/2023 | Heller et al. | |
| 2023/0205891 A1 | 6/2023 | Yellapragada et al. | |
| 2023/0221983 A1 | 7/2023 | Heller et al. | |
| 2023/0247063 A1 | 8/2023 | Luttwak et al. | |
| 2024/0168792 A1 | 5/2024 | Shemesh et al. | |
| 2024/0305664 A1 | 9/2024 | McCarthy et al. | |
| 2024/0314134 A1 * | 9/2024 | Cook | H04L 63/101 |
| 2024/0406193 A1 | 12/2024 | Lidgi et al. | |
| 2024/0411873 A1 | 12/2024 | Lande Blau et al. | |
| 2025/0350610 A1 | 11/2025 | Trabelsi et al. | |
| 2026/0003976 A1 | 1/2026 | Herzberg et al. | |
| 2026/0010357 A1 | 1/2026 | Tzabary et al. | |
| 2026/0039673 A1 | 2/2026 | Rand et al. | |
| 2026/0039711 A1 | 2/2026 | Rand et al. | |
| 2026/0105145 A1 | 4/2026 | Tzabary et al. | |
| 2026/0105168 A1 | 4/2026 | Tzabary et al. | |
| 2026/0106917 A1 | 4/2026 | Tzabary et al. | |

* cited by examiner

400

```
resource "aws_instance" "tfvm" {
    ami = "ami-0885b1f6bd170450c"
    instance_type = "t2.micro"
    vpc_security_group_ids = [ aws_security_group.websg.id ]
```

410

412

414

START

S1010
DETECT A CYBERSECURITY OBJECT IN A
DEPLOYED VIRTUALIZATION

S1020
DETECT AN APPLIED POLICY

S1030
GENERATE A CONTEXTUAL POLICY BASED
ON THE CYBERSECURITY OBJECT

S1040
CONFIGURE THE ADMISSION CONTROLLER
TO APPLY THE CONTEXTUAL POLICY

END

SYSTEM AND METHOD FOR SOFTWARE SERVICE POLICY EXCEPTION IN COMPUTING ENVIRONMENTS

TECHNICAL FIELD

The present disclosure relates generally to the field of cybersecurity and, in particular, to software service policy exception.

BACKGROUND

Software service discovery is a crucial aspect of distributed computing systems, enabling applications to locate and interact with services dynamically within a network. Essentially, it's about facilitating the seamless identification and connection of services in a networked environment. This progress becomes particularly fundamental in distributed computing, enabling dynamic interaction between services within a network. Essentially, it is about facilitating the seamless identification and connection to services in a networked environment. This process becomes particularly vital in large-scale deployments, cloud computing environments, microservices architectures, where services are constantly added, removed or scaled based on demand. Service discovery mechanisms typically involve registration where services advertise their availability, and lookup, where clients query for specific services.

Some current issues in the field of software discovery include ensuring the scalability and resilience in large scale environments, where the sheer volume of services and continuous changes in their states can strain traditional discovery mechanisms. Additionally, maintaining consistency and synchronization among service registries distributed across multiple nodes poses a challenge, often leading to potential inconsistences or service disruptions. Security is another critical concern as malicious actors could exploit vulnerabilities in the discovery process to gain unauthorized access or disrupt service availability. Moreover, interoperability between different discovery protocols and frameworks remains an ongoing challenge, hindering seamless integration across heterogenous environments. Thus, it would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include detecting a software service in a computing environment, the service including a code object and a resource. The method may also include generating a representation of the software service in a security database, the security database further including a representation of the computing environment. The method may furthermore include applying a policy on the representation of the software service, the policy including a conditional rule. The method may in addition include detecting a policy exception in response to applying the policy resulting in a policy fail of the conditional rule. The method may moreover include determining that the software service passes the policy in response to applying the policy exception resulting in a pass. The method may also include initiating a remediation action, in response to determining that applying the policy exception results in a policy fail. Other embodiments of this aspect include corresponding computer systems, apparatus, and computer programs recorded on one or more computer storage devices, each configured to perform the actions of the methods.

Implementations may include one or more of the following features. The method may include: applying the policy exception only in response to determining that the applied policy on the representation of the software service results in a fail of the conditional rule. The method may include: generating the policy exception in response to applying the policy resulting in a policy fail of the conditional rule. The method may include: applying the policy exception to each representation of a component of the software service. The method may include: determining that the software service fails the policy, in response to determining that a representation of a first component of the software service passes the policy exception, and a representation of a second component of the software service fails the policy exception. The method may include: initiating the remediation action on the second component of the software service. The method may include: initiating the remediation action on each component of the software service. The method may include: applying the policy exception on each component of the software service. The method may include: applying the policy exception on each of a plurality of software services, in response to determining that the plurality of software services are similar to the software service. Implementations of the described techniques may include hardware, a method or process, or a computer tangible medium.

In one general aspect, a non-transitory computer-readable medium may include one or more instructions that, when executed by one or more processors of a device, cause the device to: detect a software service in a computing environment, the service including a code object and a resource; generate a representation of the software service in a security database, the security database further including a representation of the computing environment; apply a policy on the representation of the software service, the policy including a conditional rule; detect a policy exception in response to applying the policy resulting in a policy fail of the conditional rule; determine that the software service passes the policy in response to applying the policy exception resulting in a pass; and initiate a remediation action, in response to determining that applying the policy exception results in a policy fail. Other embodiments of this aspect include corresponding computer systems, apparatus, and computer programs recorded on one or more computer storage devices, each configured to perform the actions of the methods.

In one general aspect, the system may include one or more processors. The system may also detect a software service in a computing environment, the service including a code object and a resource. The system may furthermore generate a representation of the software service in a security database, the security database further including a representation of the computing environment. The system may in addition apply a policy on the representation of the software service, the policy including a conditional rule. The system may moreover detect a policy exception in response to applying the policy resulting in a policy fail of the conditional rule. The system may also determine that the software service passes the policy in response to applying the policy exception resulting in a pass. The system may furthermore initiate a remediation action, in response to determining that applying the policy exception results in a policy fail. Other embodiments of this aspect include corresponding computer systems, apparatus, and computer programs recorded on one or more computer storage devices, each configured to perform the actions of the methods.

Implementations may include one or more of the following features. The system where the one or more processors are further configured to: apply the policy exception only in response to determining that the applied policy on the representation of the software service results in a fail of the conditional rule. The system where the one or more processors are further configured to: generate the policy exception in response to applying the policy resulting in a policy fail of the conditional rule. The system where the one or more processors are further configured to: apply the policy exception to each representation of a component of the software service. The system where the one or more processors are further configured to: determine that the software service fails the policy, in response to determining that a representation of a first component of the software service passes the policy exception, and a representation of a second component of the software service fails the policy exception. The system where the one or more processors are further configured to: initiate the remediation action on the second component of the software service. The system where the one or more processors are further configured to: initiate the remediation action on each component of the software service. The system where the one or more processors are further configured to: apply the policy exception on each component of the software service. The system where the one or more processors are further configured to: apply the policy exception on each of a plurality of software services, in response to determining that the plurality of software services are similar to the software service. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
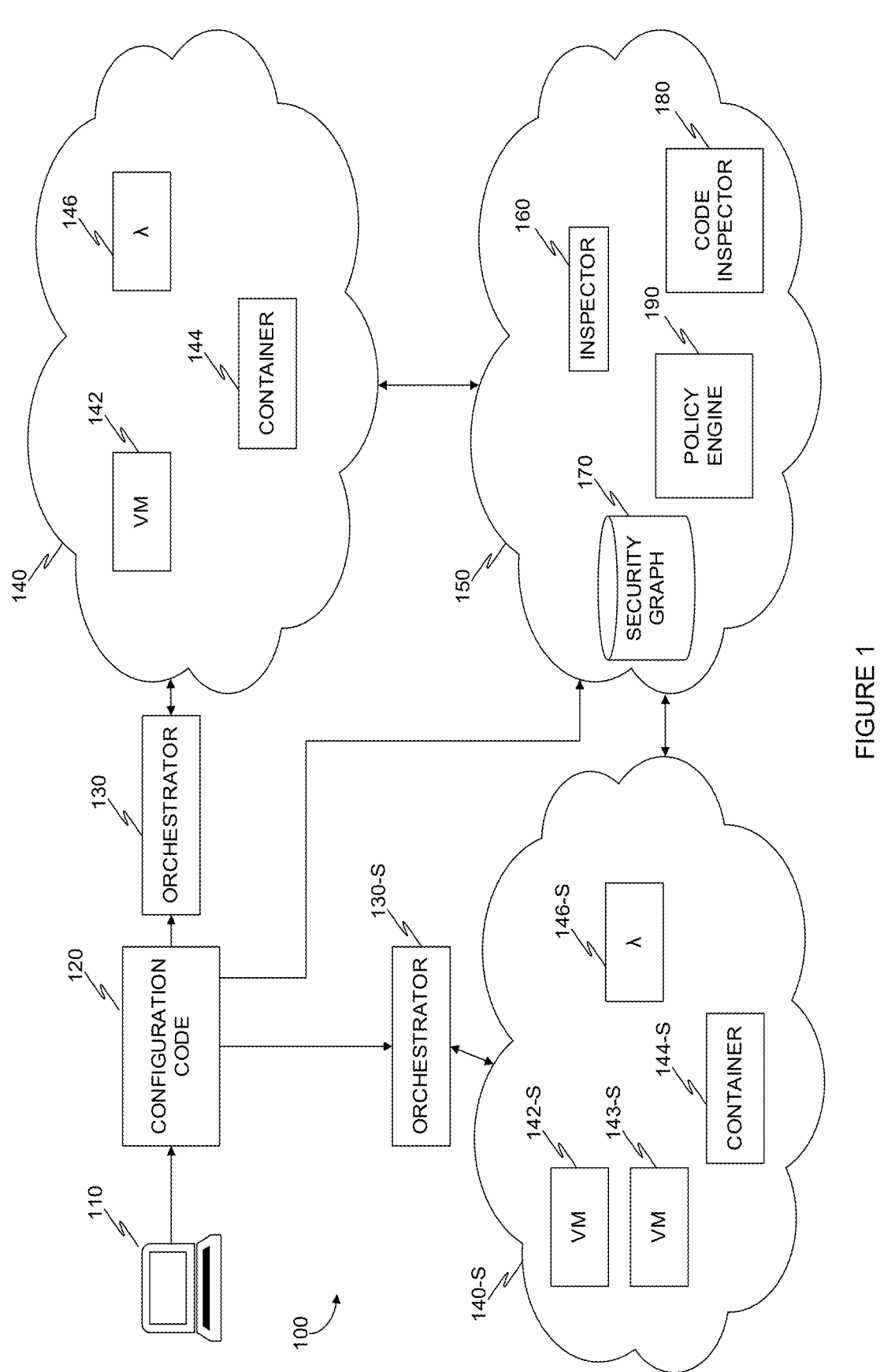
FIG. 1 is a network diagram of a monitored cloud environment utilizing infrastructure as code (IaC) utilized to describe the various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for software service policy exception.

FIG. 1 is a network diagram 100 of a monitored cloud environment utilizing infrastructure as code (IaC) utilized to describe the various embodiments.

A client device 110 generates a configuration code file 120 based on input from one or more users (e.g., software programmers). While a client device 110 is shown here for simplicity and pedagogical purposes, it should be readily apparent that the configuration code may be generated by a client device, a virtual workload in a cloud environment, and the like. Likewise, the configuration code may be generated by multiple different client devices, a single client device may generate multiple configuration codes, or any combination of these scenarios.

The configuration code file 120 may be implemented in a declaratory computer language. In a declaratory computer language, a user declares resources they would like to have as code objects, and an orchestrator 130 deploys instances in the cloud environment based on the declarations. In certain embodiments, multiple configuration code files 120 may be utilized. For example, a user may operate multiple cloud environments, each with its own configuration code. As another example, a user can declare a first resource type for a first cloud environment and for a second cloud environment in a first configuration code file, and a second resource type for the first cloud environment and the second cloud environment in a second configuration code file.

An orchestrator 130 receives the configuration code file 120. The orchestrator 130 configures a cloud environment 140 (production cloud environment) to deploy various instances based on the declarations of the configuration code file. An instance is a virtual workload, and may be, for example a virtual machine 142, container 144, or serverless function 146. The orchestrator 130 may perform deployment by assigning (also known as provisioning) cloud environment resources, such as processors, memory, storage, etc. to the virtual instance. The deployed instances are also known as a production environment. The configuration code may be implemented in a development (dev) environment, which may also be a cloud computing environment.

In some embodiments, a plurality of instances may be associated with a first object (not shown) of the configuration code file 120. This provides an advantage where it is required to deploy multiple instances which share similar configurations, such as web servers providing access to a website. Rather than configure each instance (also referred to as a workload) manually and individually, the orchestrator is able to deploy a number of the same instance based on the configuration code file 120.

In some embodiments the orchestrator 130 may configure a cloud-native orchestrator (not shown) in the cloud environment 140 to deploy the instances. This may be advantageous, for example, where instances need to be deployed in different cloud environments. For example, the same instances may be deployed simultaneously on Google® Cloud Platform (GCP), Amazon® Web Services (AWS), or Microsoft® Azure. This can be achieved by configuring the orchestrator 130 to generate native instructions for a cloud native orchestrator in each environment to deploy such instances. The native instructions may be generated by the orchestrator 130, which generates the instruction based on objects declared in the configuration code file 120. This method of deploying instances decreases errors by eliminating the need for a user to manually deploy each instance and configure each instance separately, and is also thus a faster method of deployment. In the example above a first load balancer may be deployed in a first cloud computing environment, and a second load balancer may be deployed in a second cloud computing environment, each cloud computing environment having different infrastructure from each other, wherein the first load balancer and the second load balancer are deployed based on the same code object from a configuration code file.

A second cloud environment 150 may be utilized for inspecting the first cloud environment 140 and generating security risk assessments with respect to instances in the first cloud environment 140. The second cloud environment 150 may include one or more inspectors, such as inspector 160. An inspector is a workload which inspects another workload for objects, such as secrets, files, folders, registry values, and so on. Each inspector may be configured to inspect for one or more different object types.

For example, an inspector (or other workload, not shown here) may generate a request to inspect the virtual machine 142. The request may be received through an API (not shown) of the first cloud environment 140. A snapshot may be generated of a volume of the virtual machine 142, and sent to the second cloud environment 150. A container may be deployed in the second cloud environment and attached to a volume generated in the second cloud environment based on the received snapshot. The attached volume is then accessed by the inspector 160 to inspect the volume for a specific object type(s). The inspector 160 may generate data for storing on a security graph 170.

A security graph 170 may be stored on a graph database. The security graph includes a plurality of nodes, at least a portion of which correspond to a resource or a principal. A resource may be a workload, such as a virtual machine, serverless function, container, and the like. A principal may be a user group, user account, service account, and the like. Generally, a principal acts on a resource to achieve a result. The security graph may further include enrichment nodes, which may indicate certain functionalities, network access, and the like. For example, an enrichment node may be used to indicate public internet access. Thus, a node corresponding to a workload which has public internet access, or can be accessed through a public internet connection, would be connected to an internet access node.

A code inspector 180 is further deployed in the second cloud environment 150. In an embodiment, more than one code inspector may be deployed. Configuration code may be generated by multiple different type of platforms, such as Pulumi®, Terraform®, and the like. For example, a first code inspector may inspect configuration code generated using Pulumi®, while a second code inspector may inspect configuration code generated using Terraform®. In an embodiment, the code inspector 180 is realized as a workload configured to receive configuration code and inspect the code to find one or more types of code objects. A type of code object may be, for example, a secret (such as public key, private key), resource type, policy identifier, role identifier, status of flags, and the like. A flag status may indicate that a certain object is allowed to perform certain actions, such as network access, or assume a role, such as an administrator role (in the case of a user or service account). The code inspector 180 may attempt to match the detected object(s) to one or more nodes in a security graph. This is discussed in more detail with respect to FIG. 2 below. Code inspectors are discussed in more detail in U.S. non-provisional patent application Ser. No. 17/532,557 the entire contents of which are incorporated herein by reference.

The second cloud environment 150 further includes a policy engine 190. A policy engine 190 may be implemented as a workload, such as a virtual machine or container. The policy engine 190 may include a plurality of rules, each of which may include a condition and an action. A rule may be implemented, for example, as an 'if-then' statement. In an embodiment, the policy engine 190 may periodically check if one or more of the rules are violated by a workload or account in the first cloud computing environment 140. The policy engine 190 may further include policies, which indicate permissions associated with workloads, accounts, or both. For example, a policy may state that a user account belonging to a first user group is authorized to access the VM 142. In an embodiment, the policy engine 190 may be implemented in the first cloud environment 140, and accessible by the second cloud environment 150.

The configuration code 120 may be further accessed by a stage environment orchestrator 130-S. While this embodiment utilizes an orchestrator 130 for a production cloud environment 140, and a stage environment orchestrator 130-S for a staging cloud environment 140-S, it should be apparent that a single orchestrator may be used for both the production and stage environments. A staging cloud environment 140-S is a cloud computing environment which is practically identical to the production cloud environment 140, other than the presence of test workloads, or other changes which are tested in order to later deploy them in the production environment. A staging environment is used for testing purposes, for example to determine if a workload can handle a volume of expected traffic. Typically, workloads are deployed in a staging environment prior to deployment in a production environment, so as to detect any issues which the workload may cause in the production environment.

For example, a second VM 143-S is a workload which is deployed in the staging cloud environment 140-S, but not yet deployed in the production cloud environment 140. A first VM 142-S is a workload identical to VM 142, a container 144-S is a workload identical to the container 144 deployed in the production cloud environment 140, and a serverless function 146-S is identical to the serverless function 146.

It is common that workloads in the production environment 140 trigger errors, based for example on policies of the production cloud environment 140. A policy engine 190 may allow users to configure an exception to an error. For example, if a VM 142 triggers an error (i.e. violates a policy), an exception may be added to the policy engine 190, to ignore the error when applied to the VM 142. An exception may be implemented as a rule in the policy engine 190. However, as the exception is specific to the VM 142, the staging environment VM 142-S, which is identical to the VM 142, would trigger an error, based on violating the same policy. This can be overcome by representing configuration code objects, objects of the staging environment 140-S, and objects of the production environment 140, all in a security graph 170. An example for such a method is discussed in more detail with respect to FIG. 8 below.

Figure 2:
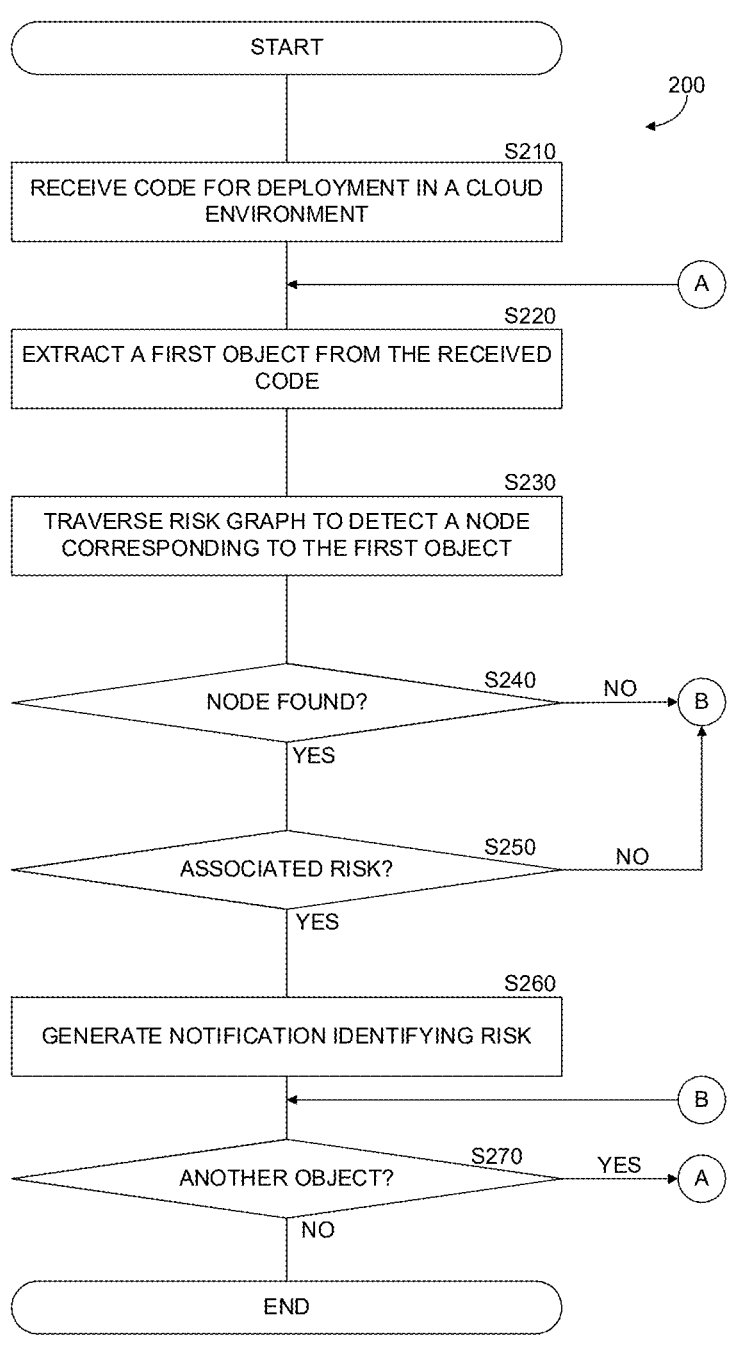
FIG. 2 is a flowchart of a method for inspecting configuration code based on a security graph, implemented in accordance with an embodiment.

FIG. 2 is an example flowchart 200 of a method for inspecting configuration code based on a security graph, implemented in accordance with an embodiment. The method provides the ability to inspect configuration code in a development (dev) environment based on a security graph which is generated at least in part based on a production environment. The production environment is rarely, if at all, identical to the environment which is deployed initially by code. This is due to, for example, upgrades and patches implemented in the production environment. As production teams and dev teams are usually not the same, there is a phenomenon known as configuration drift, which describes how the production environment, over time, 'drifts' further away from the initial configuration code design.

The security graph may be generated based both off of the code and the production environment. By inspecting the configuration code based on a security graph generated from data from the production environment, insight can be gained and deployment issues may be caught early on, for example to identify instances which if deployed based on a current version of configuration code would include a version of software which the production environment has already upgraded to a newer version. The method may be performed by a configuration code inspector, such as the code inspector 180.

At S210, configuration code is received by, for example, a configuration code inspector. The configuration code includes a plurality of code objects, at least a portion of which correspond to instances which are intended to be deployed in a cloud computing environment. The configuration code may be scanned or otherwise inspected as a textual object, meaning it can be searched for regular expressions (regex), strings, and the like.

At S220, a first code object is extracted from the received code. Extracting a code object may include, for example, searching the text of a configuration code file for one or more predetermined strings. For example, a code object may be a text field identifying a type of workload, a name of a workload, a network address, a name in a namespace, a role, a permission, and the like.

At S230, a security graph is traversed to detect if a node in the graph corresponds to the extracted first object. Traversing the security graph may include, for example, sending a request through an API of a graph database hosting the security graph to search the graph for a string or value corresponding to the first object. For example, if the first object is a secret, such as a private key, the security graph may be traversed to determine if there is a node which represents the matching public key. In some embodiments, a query directed at the security graph may include a plurality of clauses, for example, to search for container nodes which are attached to a node which represents the public key. It is worth noting that detecting a node which corresponds to the extracted first object may include nodes which are not a node representing a workload corresponding to the first object.

For example, executing code of the first object may result in deploying a first load balancer in a virtual private cloud (VPC). Once the first load balancer is deployed, a node may be generated in a security graph to represent the first load balancer and would be connected to a node representing the VPC. An advantage of the disclosed method is that attributes of the first object may be detected in the graph, which allows to detect nodes prior to the generation of the actual workload. In other words, a security risk may be detected in a workload prior to it being deployed. In this example, as the code of the first object includes instructions to deploy in the VPC, the VPC node may be detected, and from there an assessment may be made regarding security risks which are associated with the VPC, or with deploying a load balancer in the VPC.

At S240, a check is performed to determine if a node is detected. If 'no' execution may continue at S270. In an embodiment, if a match does not exist, a new node may be generated in the security graph to represent the first object. If a match exists execution continues to S250.

At S250, a check is performed to determine if the matched node corresponds to a previously determined risk factor, or vulnerability. A risk factor, or vulnerability, may be, for example, access to/from a network resource (such as the internet), outdated software, privilege escalation, and the like. A risk factor score may be further determined in some embodiments. The score may indicate the severity of the risk, such as 'low', 'medium', 'high', and 'critical'. In an embodiment, different instructions may be executed based on the risk factor score. The risk factor may be indicated by metadata associated with the matched node. The metadata may be, for example, data fields which indicate that a risk factor is present. For example, a flag may indicate if a node has external network access. If the matched node corresponds to a previously determined risk factor execution continues at S260, otherwise execution continues at S270. In an embodiment a vulnerability may be represented on the security graph by a node. As an example, a node corresponding to a workload may be connected to a vulnerability node. Therefore. if the workload node is the matched node, then a security vulnerability may be associated with the code object.

At optional S260 a notification may be generated to indicate that a security risk has been detected in the configuration code. In an embodiment the notification may be generated and sent to the client device, user account(s), or both, which authored the code. In some embodiments, the notification may include an indicator to specify why the notification is generated, and what should be performed to mitigate the risk. In the example above, an alert (notification) would be generated if workload includes an outdated software version, and the alert would include the current version, which would need to be configured in the code so as to pass the check.

At S270 a check is performed to determine if another code object should be inspected. If 'yes' execution continues at S220, otherwise execution terminates.

Figure 3:
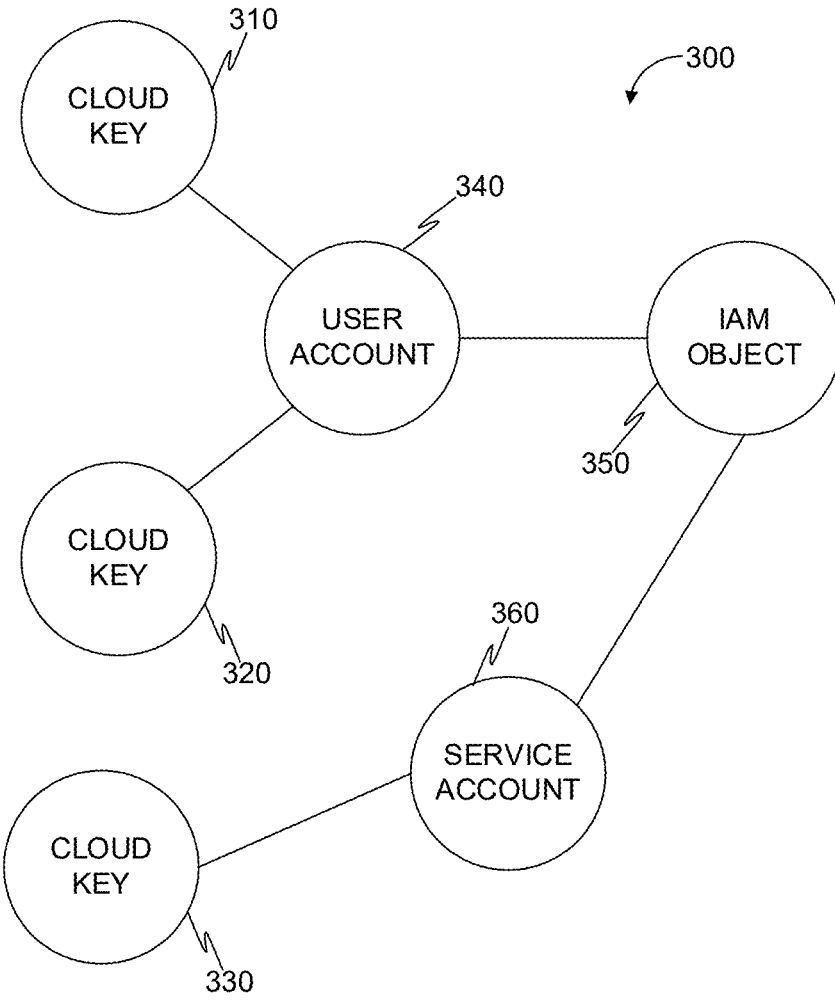
FIG. 3 is a schematic illustration of a portion of a security graph for risk assessment of instances in a cloud based computing environment, implemented in accordance with an embodiment.

FIG. 3 is a schematic illustration of a portion of a security graph 300 for risk assessment of instances in a cloud based computing environment, implemented in accordance with an embodiment. The graph 300, which may be stored in a graph database, includes a plurality of nodes. A node may represent a resource, principal, metadata, enrichment data, and the like.

In this example, the graph includes a first cloud key node 310 and a second cloud key node 320, which are connected to a user account node 340. A third cloud key node 330 is connected to a service account node 360. The user account node 340 and service account node 360 are connected to an identity and access management (IAM) object node 350.

A cloud key may provide temporary or permanent access between a first workload and a second workload. In some embodiments, one or more first workloads and one or more second workloads may be on the same tenant, on different tenants, or on a combination thereof. Cloud keys may be embedded into text configuration files, structured configuration files (e.g., JSON, YAML, XML, etc.), scripts, source code, and the like. Example implementations of cloud keys include AWS IAM access keys, OAuth refresh tokens, access tokens, and the like.

By generating a graph including such nodes and populating it with data based on the cloud based computing environment. it is possible to assess security risks. For example, if a first cloud key is compromised, it is readily apparent what other objects are vulnerable as a result. In an embodiment each node may further store metadata and data relating to the object. For example, a cloud key node 320 may include therein a unique account identifier.

Figure 4:
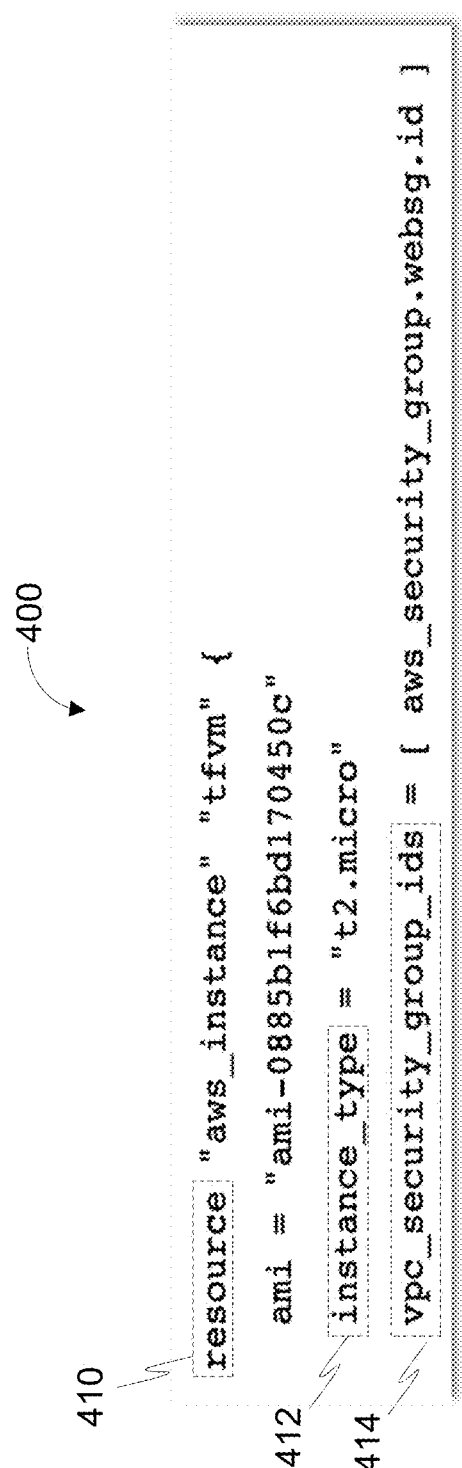
FIG. 4 is an example of a code object, in accordance with an embodiment.

FIG. 4 is an example of a code object, shown in accordance with an embodiment. A code object 400 includes an object type 410. The object type 410 indicates, in this example, that this code object is a resource type, i.e. executing instructions related to this object will deploy a resource in a cloud computing environment. The object type further includes data fields, such as instance type data field 412 and network association data field 414. The instance type 412 specifies what type of resource is to be deployed, in this case the instance type is a t2.micro, which is a processing instance used in the AWS cloud computing environment. The network association field 414 indicates, in this example, that the instance should be associated with a specific virtual private cloud (VPC). In this example the code object is a data structure having parameters (or data fields) which can be customized to generate resources, accounts, and the like, in a cloud computing environment.

Figure 5:
FIG. 5 is a schematic illustration of a unified policy engine across multiple cloud environments, implemented according to an embodiment.
Figure 5:
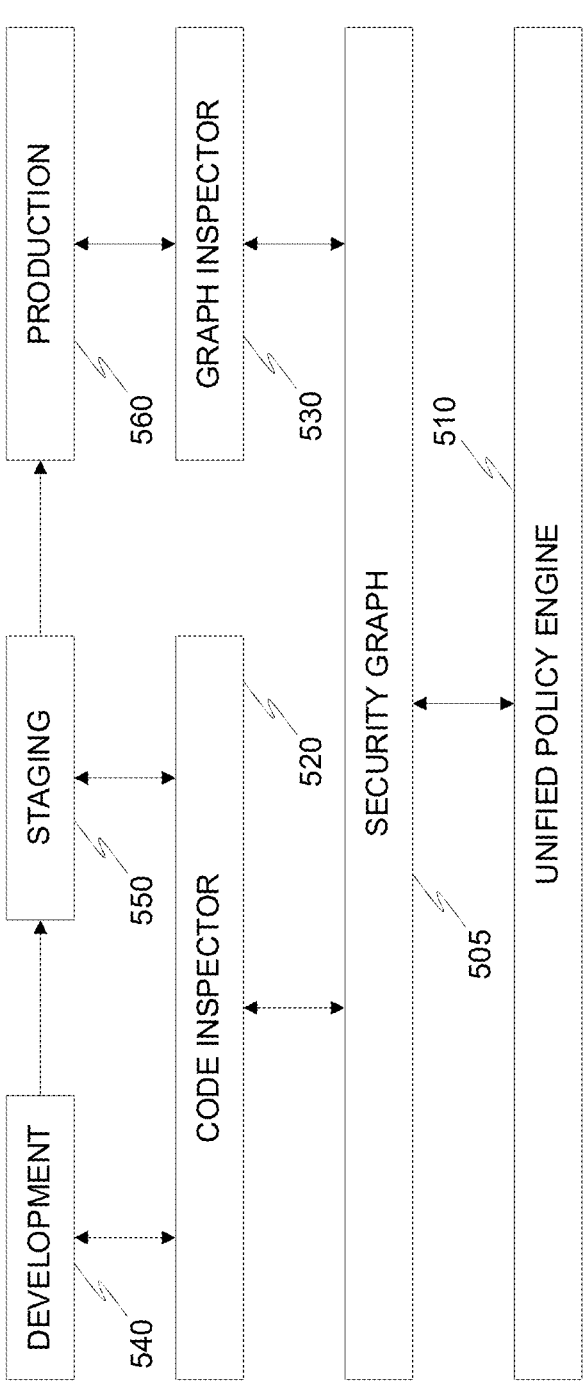

FIG. 5 is an example of a schematic illustration 500 of a unified policy engine across multiple cloud environments, implemented according to an embodiment. A unified policy engine 510 is a policy engine which can be utilized across a full technology stack. A production cycle typically begins in a development environment 540. The development environment may include sandboxed applications, infrastructure as code (IaC) declaratory code (such as configuration code 120 of FIG. 1), and the like. For example, Microsoft® Azure offers Azure DevOps Services which may serve as a cloud based development environment.

After a workload, policy, or other change in infrastructure is approved from the development environment 540, it is implemented in a staging environment 550. For example, a workload is deployed in the staging environment 550, policy change is updated into a policy engine of the staging environment 550, and the like. A staging environment 550 may be implemented as a cloud computing environment which is identical, or similar, to a production environment in which the workload or change is ultimately deployed. The purpose of a staging environment 550 is to provide a testing environment which simulates the production environment to a high degree. This allows to eventually deploy a workload, for example, with a relatively high certainty that the workload will perform as expected. Where a workload does not perform as expected, it may be returned to the development environment 540, in order to address any problems which were detected during deployment in the staging environment 550.

A workload which passes testing of the staging environment 550 may be implemented in a production environment 560. The production environment is a cloud computing environment which is in real time use.

In an example embodiment, a code object may be written as code in a configuration code file, stored in the development environment 540. The configuration code file may then be executed, for example by Terraform®, to deploy a workload (or user account, as another example) based on the code object in the staging environment 550. The deployed workload may be tested in the staging environment 550, for example by executing performance tests, load tests, and the like. If the deployed workload passes the tests in the staging environment 550, the code object may be added to a main configuration code file (or committed, per industry term). The next time the main configuration code file is utilized, the code object will be used to deploy instances in the production environment 560.

Inspectors may be utilized to inspect various objects across different compute environments. For example, a code inspector 520 may inspect for at least an object in each of the development 540 and staging environments 550. As another example, a graph inspector 530 may inspect for graph objects (i.e. objects which appear in a security graph) in the production environment 560. While this embodiment shows inspector workloads operating in different environments, this is merely for simplicity and pedagogical purposes. In certain embodiments a first inspector, inspecting for a first object type, may inspect each cloud environment for the first object type. In other embodiments, an inspector for the first object type may be implemented for each compute environment. In some embodiments an inspector may inspect for an object having a data field, attribute, or other value configured to a predetermined value.

Typically, system administrators will make changes to a production environment policy in response to detecting a real-world event (as opposed to theoretical test cases done in staging). For example, in response to detecting a vulnerability, a system administrator may update, or create, a policy to address the vulnerability. The policy is stored in a cloud environment of the production environment 560, which is not accessible to the staging environment 550, and typically not readable by the development environment 540. Further, there is no way for an operator of the development environment 540 or staging environment 550 to know about the policy change. Therefore, operators of the development environment 540 and staging environment 550 may continue to create workloads which violate the policies set forth in the production environment 560.

By utilizing the inspector workloads across all the compute environments, and representing the detected objects in a security graph 505, a unified policy engine 510 may be utilized, which can be used to implement a policy across all the compute environments. In this example, a code object may be detected in the development environment 540. The code object is inspected and the content of the code object (e.g. identifier, type, etc.) may be matched to a node of the security graph 505. The node may be associated with a policy which is accessible to the unified policy engine 510. A check may be performed to determine if an instance generated based on the detected code object would comply with the associated policy. Thus, a code object can be failed at the development environment 540 based on a policy of the production environment 560, without wasting resources and time of going through staging, for example.

Figure 6:
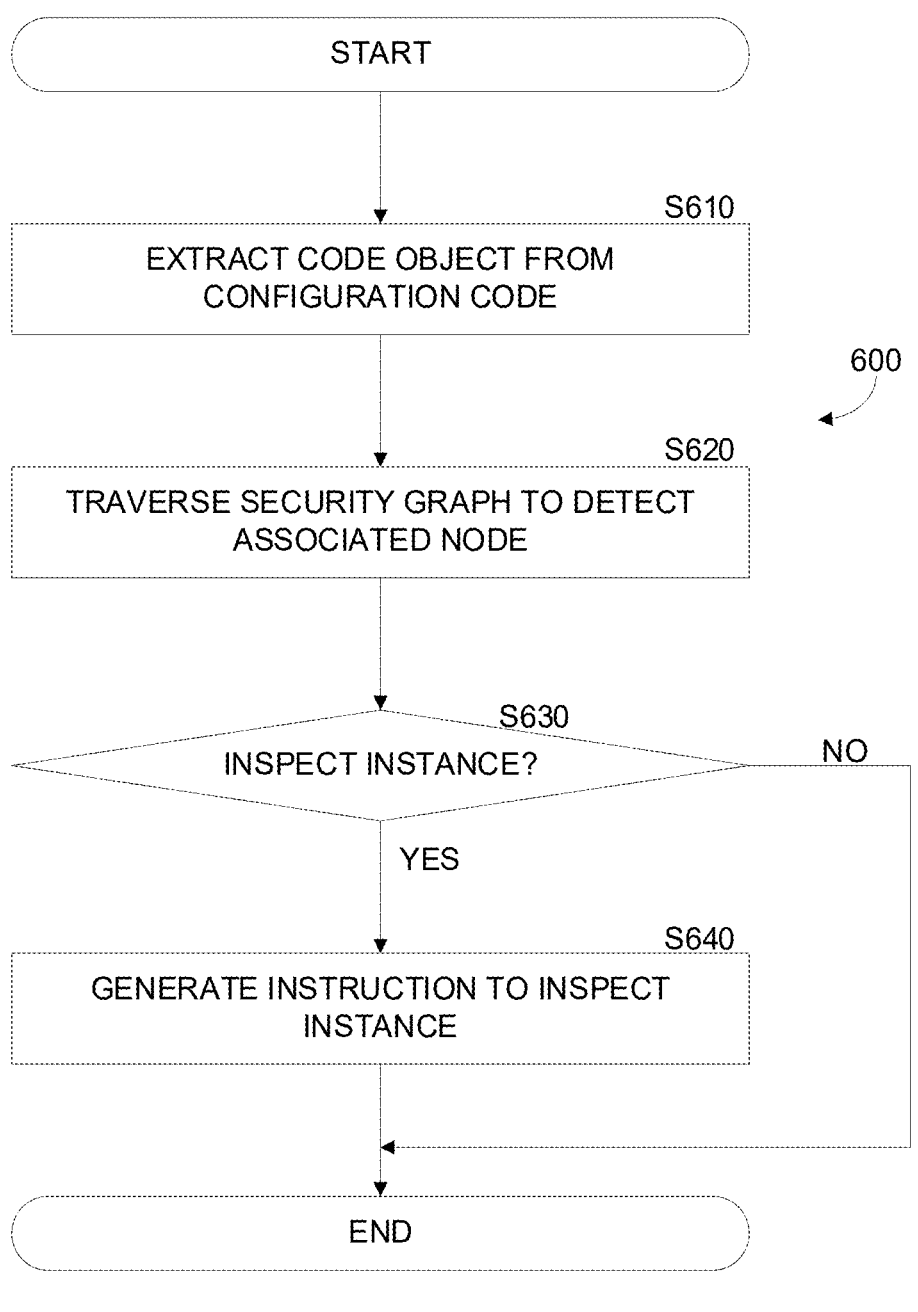
FIG. 6 is a flowchart for generating an inspection instruction based on a detected code object, implemented in accordance with an embodiment.

FIG. 6 is an example of a flowchart 600 for generating an inspection instruction based on a detected code object, implemented in accordance with an embodiment.

At S610 a code object is extracted from a configuration code file. The configuration code file includes a plurality of code objects, at least a portion of which include instructions that, when executed by an orchestrator, cause generation of principals or resources in a cloud computing environment.

At S620 a security graph is traversed to detect a node which is associated with the code object. A node is associated with a code object if, for example, a data field of the node and a data field of the code object match. In the example presented in FIG. 5 above the code object may be matched to a node which represents a VPC. A code object may also match a node, if for example a workload generated based on the code object is represented by the node.

At S630 a check is performed to determine if the detected node should be inspected. If 'yes' execution continues at S640. If 'no' execution may terminate, or in another embodiments continue at S620 with another node. In yet another embodiment if the check returns 'no' execution may continue at S610 with another code object.

At S640 an instruction to initiate an inspection of a workload corresponding to the node is generated. Inspecting the workload may include generating a snapshot of a disk of the workload, and providing access to the snapshot through an inspection service account to an inspector (such as inspector 160 of FIG. 1). In an embodiment a volume may be mounted based on the snapshot, which the inspector 160 may access to inspect for at least a data object.

Generating inspection instructions based on code objects is advantageous as it reduces the requirement to inspect a network environment for virtual workloads. Instead, new workloads may be discovered by inspecting the code which generates them, while security issues in workloads in a production environment may in turn be traced back to code objects from which they are generated.

Figure 7:
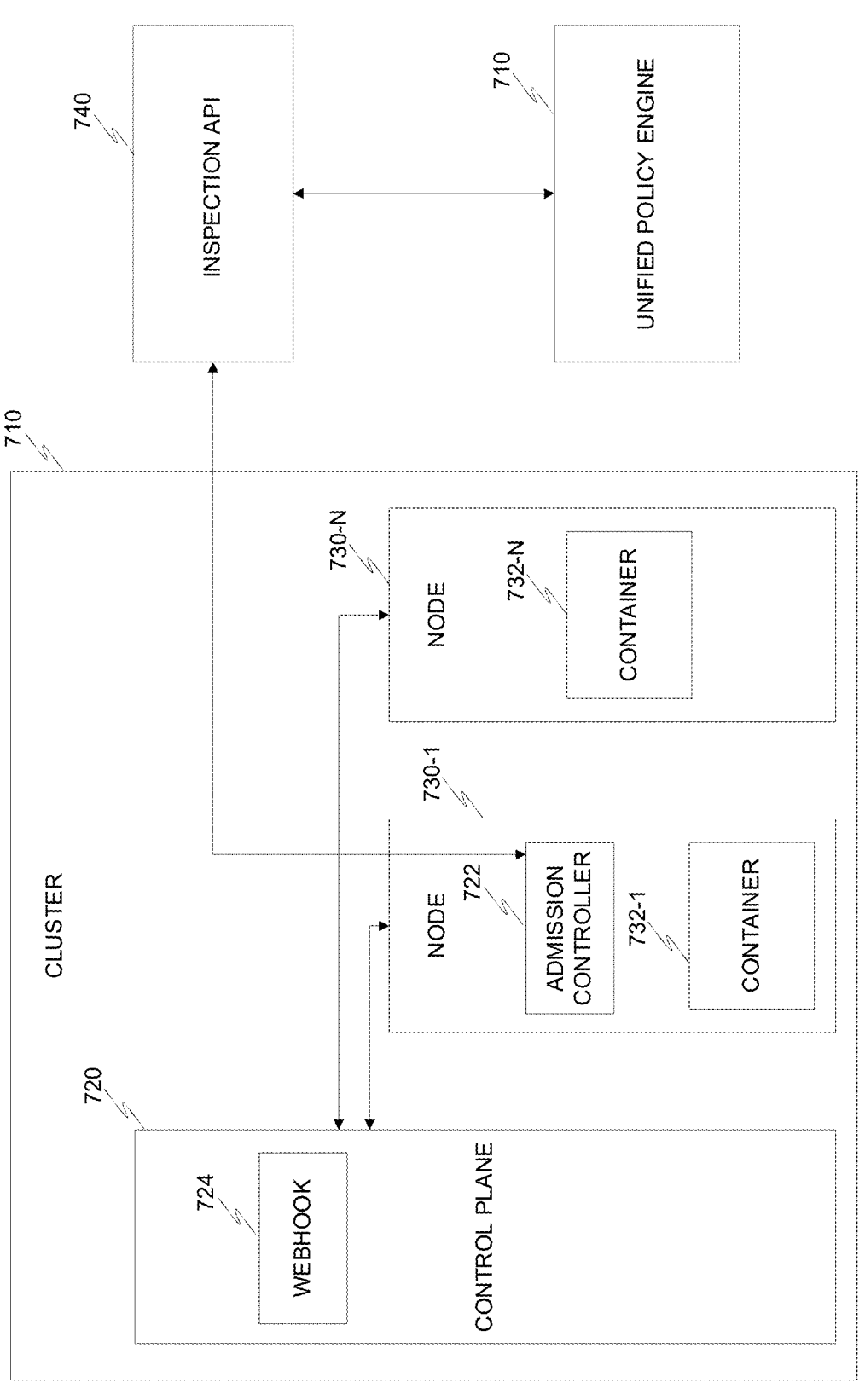
FIG. 7 is an example of a schematic of a software container cluster having an admission controller for policy implementation, utilized to describe an embodiment.

FIG. 7 is an example of a schematic of a software container cluster having an admission controller for policy implementation, utilized to describe an embodiment. In an embodiment, a container cluster 710 is deployed on a computer system, such as described in more detail in FIG. 10 below.

In some embodiments, a software container cluster 710 is implemented utilizing a Kubernetes® platform, a Docker® Engine, and the like. In certain embodiments, a software container cluster 710 is configured to deploy a plurality of software containers. In an embodiment, a software container is a containerized software application.

In certain embodiments, a container cluster 710 includes a control plane 720 configured to communicate with an inspection application programming interface (API) 740, and a plurality of nodes 730-1 through 730-N, where 'N' is an integer having a value of '2' or greater, individually referred to as node 730 and collectively referred to as nodes 730.

In an embodiment, the control plane 720 is implemented on a single machine in the cluster. In some embodiments, the machine on which the control plane 720 is implemented only executes components of the control plane 720. For example, in an embodiment, the machine does not include a container based on a user-generated image, base image, and the like.

For example, in some embodiments, a Kubernetes container cluster control plane 720 includes components such as an API server, a key value store, a scheduler, a controller, and the like. In an embodiment, the API server is implemented as a kube-apiserver, which is configured to expose the Kubernetes API to external resources. In certain embodiments, the key value store is configured to store key values, cluster data, and the like.

In some embodiments, the controller includes a node controller, a job controller, a service account controller, and the like. In certain embodiments, the control plane 720 includes a webhook 724. In an embodiment, the webhook 724 is a validating webhook, a mutating webhook, and the like. In an embodiment, a webhook 724 is configured to detect a request to an API, to another node in the cluster, and the like. In certain embodiments, the webhook 724 is further configured to send the request to an admission controller 722.

In an embodiment, the cluster 710 includes a plurality of nodes 730-1 through 730-N. In certain embodiments, each node 730 includes a container 732. In some embodiments, the container 732 includes a containerized software application. In certain embodiments, a node 730 includes a plurality of containers, an agent, a network proxy, a combination thereof, and the like. In an embodiment, a containerized software application includes a software, dependencies of the software, a combination thereof, and the like.

In certain embodiments, an inspection API 740 is configured to expose resources, communication, and the like, with a cloud computing environment. For example, in an embodiment, a cloud computing environment is a virtual private cloud (VPC), a virtual network (VNet), and the like, deployed on a cloud computing infrastructure. In an embodiment, a cloud computing infrastructure is Amazon® Web Services (AWS), Google® Cloud Platform (GCP), Microsoft® Azure, and the like. In certain embodiments, the control plane 720 of the cluster 710 is configured to communicate through the inspection API 740.

In some embodiments, an admission controller 722 is deployed on a node 730-1. In an embodiment, an admission controller 722 is configured to receive intercepted requests to the API server of the control plane 720. For example, in an embodiment, a software container 732-N is configured to communicate through a node 730-N to an API server of the control plane 720, which in turn is configured to communicate with the inspection API 740.

In certain embodiments, the admission controller 722 is implemented as computer software deployed on a node of the cluster 710. In some embodiments, the admission controller 722 is configured to communicate with a unified policy engine 810, for example through the inspection API 740.

In some embodiments, the admission controller 722 is configured to request a policy from the unified policy engine 710. In an embodiment, the admission controller 722 is configured to apply the received policy on a request intercepted from a container 732-1 of a node 730-1.

In some embodiments, a policy includes a conditional rule. For example, in an embodiment, a policy includes a conditional rule, utilized to check if a network communication is directed to an IP address which is on a list of banned IP addresses. In an embodiment, a request is generated by a software container 732-N to send a network message, the request including a destination address (e.g., an IP address). In an embodiment, the request is delivered from the node 730-N to the control plane 720, where the request is intercepted by the webhook 724. The request is sent to the admission controller 722, which is configured to apply a policy on the request.

In some embodiments, the admission controller 722 is configured to apply a policy to the request. For example, in an embodiment, the admission controller 722 is configured to apply a conditional rule such that if a communication is directed to an IP address stored in a list of blocked IP addresses, the communication is denied, and the request is not passed to the inspection API 740. In certain embodiments, the admission controller 722 is configured to apply a conditional rule such that if a communication is not directed to an IP address stored in a list of blocked IP addresses, the communication is allowed to pass through, and is forwarded, for example, to the inspection API 740.

In an embodiment, the admission controller 722 is configured to apply a conditional rule such that if a communication is directed to an IP address stored in a list of allowed IP addresses, the communication is allowed, and the request is passed to the inspection API 740. In some embodiments, the admission controller 722 is configured to apply a conditional rule such that if a communication is not directed to an IP address stored in a list of allowed IP addresses, the communication is denied, and the request is not passed to the inspection API 740.

Figure 8:
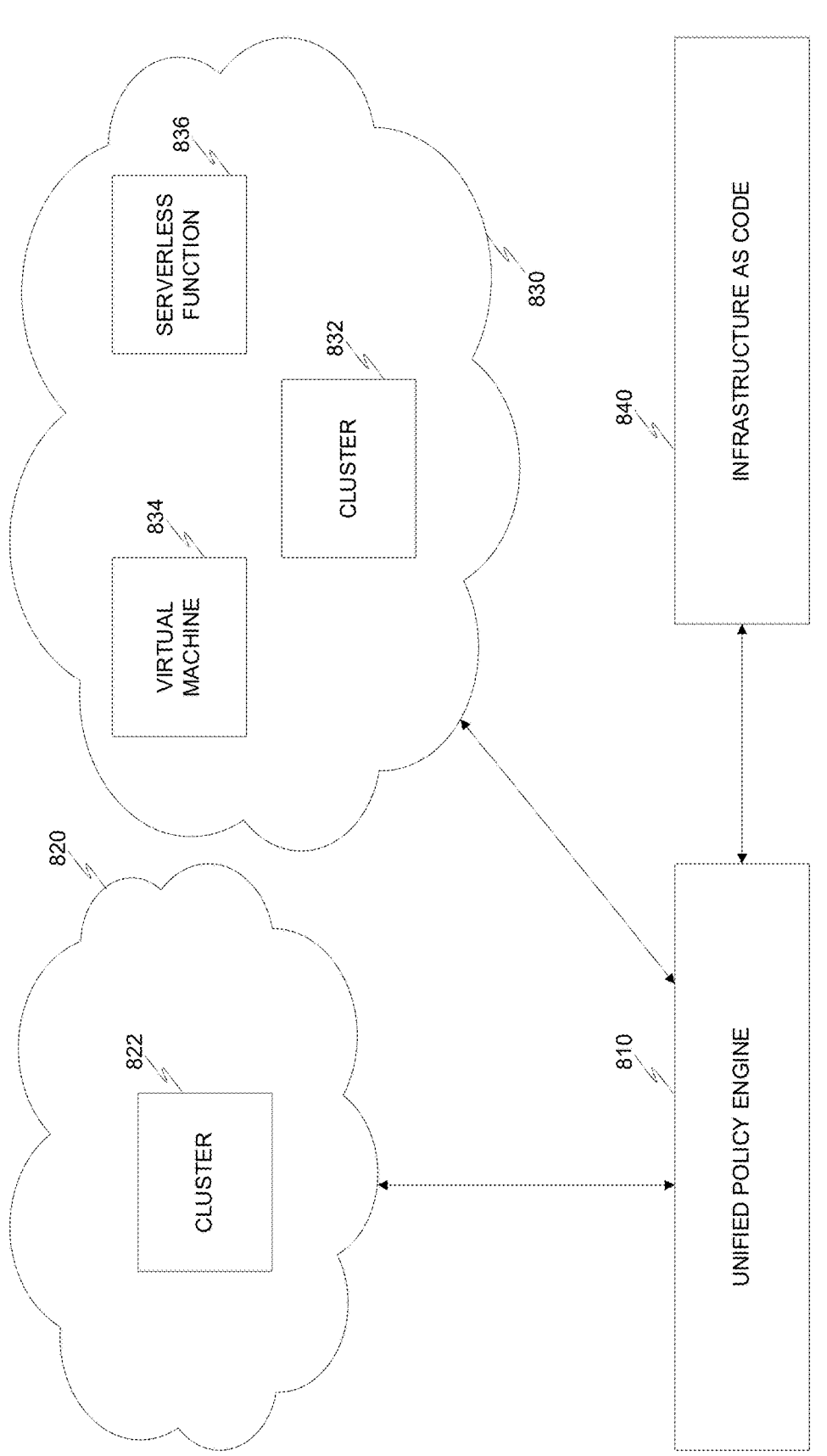
FIG. 8 is an example of a network diagram with multiple computing environments utilizing a unified policy engine, implemented according to an embodiment.

FIG. 8 is an example of a network diagram with multiple computing environments utilizing a unified policy engine, implemented according to an embodiment. In an embodiment, a unified policy engine 810 includes a rule, a policy, a combination thereof, and the like. In some embodiments, a rule includes a condition, for example such that when the condition is met an action is performed, when the condition is met an action is refrained from being performed, when a condition is not met an action is performed, when a condition is not met an action is refrained from being performed, combinations thereof, and the like.

In some embodiments, a unified policy engine 810 supplies rules, policies, and the like, to various computing environments. For example, in an embodiment, the unified policy engine supplies a rule to a first cloud computing environment 820, a second cloud computing environment 830, and an infrastructure as code (IaC) environment 840.

In an embodiment, a cloud computing environment is a virtual private cloud (VPC), a virtual network (VNET), and the like, implemented on a cloud computing infrastructure. According to an embodiment, a cloud computing infrastructure is, for example, Amazon® Web Services (AWS), Microsoft® Azure, Google® Cloud Platform (GCP), and the like.

In certain embodiments, an IaC environment 840 is utilized, for example, with Terraform®, Ansible®, Chef®, Puppet®, and the like. In an embodiment, the second cloud computing environment 830 includes a virtual machine 834, a serverless function 836, a cluster 832, etc., a combination thereof, and the like.

In certain embodiments, security policies are maintained for different compute environments, for example in order to secure certain digital assets, prevent unwanted or unintended access, and the like. In some embodiments, for example where continuous integration and continuous deployment (CI/CD) is implemented, multiple compute environments are related. For example, according to an embodiment, declaratory code in an IaC environment 840 is utilized to deploy a software container cluster 822 in a staging environment 820.

In an embodiment, a staging environment is a cloud computing environment in which resources, principals, and the like, are deployed prior to being deployed in a production environment, such as production environment 830. This is beneficial as it allows to test and benchmark a resource, such as the container cluster 822 prior to deploying a counterpart to the container cluster 822 in the production environment 830. For example, in an embodiment, the counterpart to the container cluster 822 deployed in the staging environment 820 is the software container cluster 832 deployed in the production environment 830.

According to an embodiment, once a resource, such as the container cluster 822 passes a benchmark, test, and the like, code utilized to deploy the container cluster 822 in the staging environment 820 can be utilized to deploy the container luster 832 in the production environment 830. In some embodiments, it is beneficial to take action based on a code object, a resource deployed in a staging environment based on the code object, and a corresponding resource deployed in the production environment, wherein the action applies to each of the code object and two resources.

For example, in some embodiments, it is useful to employ a policy on a code object, on a resource deployed in a staging environment 820, and a corresponding resource deployed in a production environment 830, as all these correspond to each other. In certain embodiments, a policy is enacted based on observation of a resource, such as the container cluster 822, in a staging environment.

Utilizing a unified policy engine 810 allows to store a single policy utilized by each related computing environment. This is preferable to storing a corresponding policy in each computing environment, especially when these computing environments are related to each other. In an embodiment, utilizing a single unified policy engine 810 also reduces storage space required to store redundant similar policies, as it eliminates the need to store a corresponding policy in each different (yet related) computing environment.

Furthermore, configuring a software container cluster to deploy an admission controller which is configured to utilize policies from the unified policy engine 810 provides a level of assurance that a policy is enacted on each container in the cluster, and across multiple clusters in any computing environment. A single policy is therefore applied equally, objectively, and consistently. While it is recognized, for example, that a human can apply a condition to a resource, it is also recognized that a human is incapable of applying a condition (e.g., a policy) in a manner that is equal and objective in a consistent manner across multiple computing environments, and can certainly not do so within a timeframe that would make application of such a policy useful.

Figure 9:
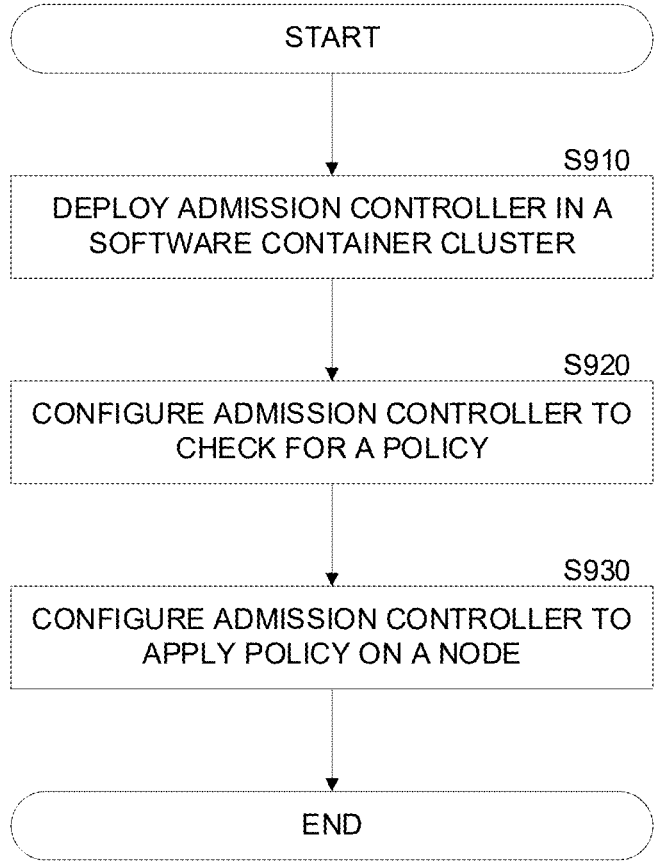
FIG. 9 is an example flowchart of a method for deploying a policy-enforcing admission controller for a software container, implemented in accordance with an embodiment.

FIG. 9 is an example flowchart of a method for deploying a policy-enforcing admission controller for a software container, implemented in accordance with an embodiment.

At S910, an admission controller is deployed. In some embodiments, a plurality of admission controllers are deployed. In an embodiment, the admission controller is deployed in a control plane of a software container cluster. In some embodiments, a software container cluster is implemented on a Kubernetes® platform.

In certain embodiments, the admission controller is configured to intercept API requests between a node in the container cluster and an inspection API of the container cluster. In an embodiment, the admission controller is configured as a mutating admission controller, a validating admission controller, a combination thereof, and the like. In certain embodiments, a plurality of admission controllers, including a mutating admission controller and a validating admission controller, are deployed.

In some embodiments, a mutating admission controller is configured to modify a request which is received by the admission controller. For example, in an embodiment, the admission controller is configured to modify a request based on a policy received from a unified policy engine.

In certain embodiments, a validating admission controller is configured to validate a request without changing the request itself. In certain embodiments, an admission controller is configured to validate a request which was modified by a mutating admission controller.

At S920, a check is performed for a policy. In an embodiment, an admission controller is configured to periodically check, for example by sending a request to a unified policy engine, to receive a new policy. In certain embodiments, the admission controller is configured to send to the unified policy engine a policy version number. In some embodiments, the unified policy engine is configured to compare a received policy version to a stored policy version, and send an admission controller the stored policy version in response to determining that the received version is older than the stored version.

At S930, the policy is applied. In an embodiment, the admission controller is configured to apply the policy, for example, on a container deployed in a node of the cluster where the admission controller is deployed. In certain embodiments, a plurality of policies are applied.

In some embodiments, an admission controller is configured to merge a plurality of policies, such as a first policy and a second policy, into a single policy, and apply the single policy to each container, pod, and the like, in the cluster. In certain embodiments, a policy is merged by extracting a conditional rule from a first policy, extracting a conditional rule from a second policy, and generating a new conditional rule, for example by adding a Boolean "AND" operator between the conditional rule of the first policy and the conditional rule of the second policy.

In some embodiments, a policy is applied to each occurrence where a node, a pod, a container, and the like, access the control plane of the cluster. For example, in an embodiment, a policy is applied in response to detecting an instruction to deploy a node, a pod, a container, a combination thereof, and the like, in the cluster. In some embodiments, a policy is applied on a request originating from a node, a pod, a container, a combination thereof, and the like, such as a request to communicate with an IP address through an inspection API.

Figure 10:
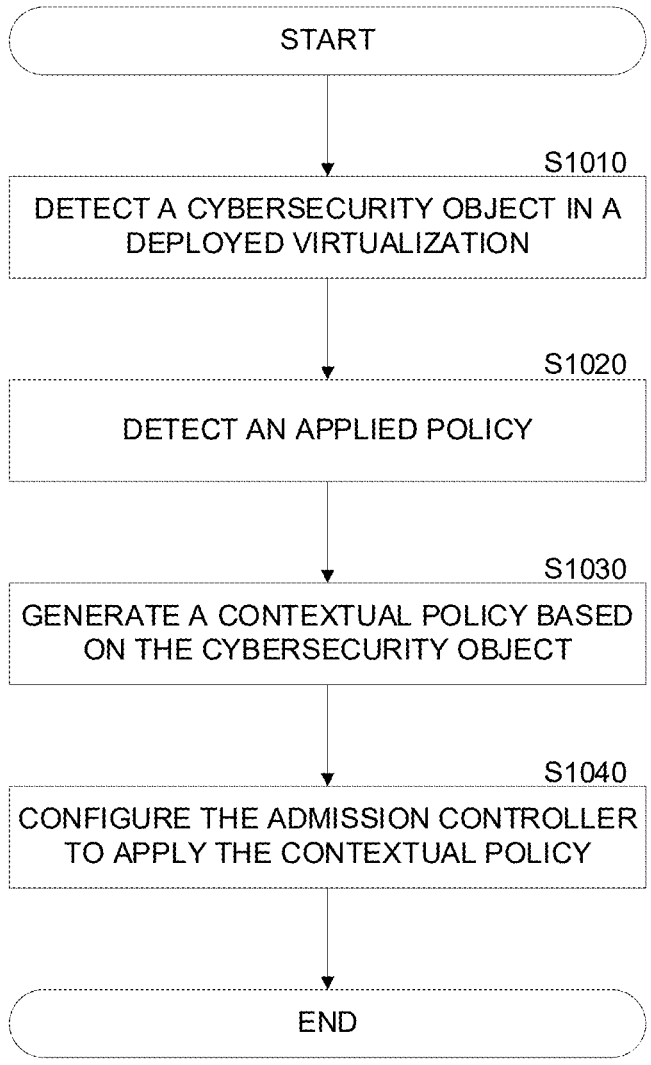
FIG. 10 is a flowchart of a method for generating a contextual policy in a computing environment, implemented in accordance with an embodiment.

FIG. 10 is a flowchart of a method for generating a contextual policy in a computing environment, implemented in accordance with an embodiment. In certain embodiments, a contextual policy is generated based on an existing policy, based on an exception to an existing policy, based on a detected cybersecurity object in a computing environment, combinations thereof, and the like.

In an embodiment, a contextual policy is a policy which is generated based on a context detected in a computing environment. For example, in some embodiments, a policy includes a condition that a cybersecurity object of a first type, such as a cleartext password, should not be stored on a deployed resource.

In an embodiment, a context is generated for a detected cybersecurity object. For example, in some embodiments, a first cleartext password provides a limited set of permissions in a cloud computing environment, while a second cleartext password provides administrator privilege in the cloud computing environment. In some embodiments, context is generated based on a security graph which stores therein a representation of a computing environment. For example, according to an embodiment, a node in the security graph represents a resource, a principal, a context, an enrichment, an endpoint, a combination thereof, and the like.

By determining the context of each cleartext password, according to an embodiment, it is possible to permit some workloads to deploy (e.g., workloads which contain a cleartext password with limited permissions) while denying deployment of other workloads (e.g., workloads which contain a cleartext password with administrator privileges).

In an embodiment, a security graph is generated by performing network discovery of a computing environment, and inspecting, scanning, and the like, each discovered resource in the computing environment for cybersecurity objects. In some embodiments, each discovered resource, cybersecurity object, and the like, is represented as a node in the security graph. In certain embodiments, principals are detected in the computing environment, such as a user account, a service account, a role, and the like. In some embodiments, an identity and access management service is accessed to determine a permission associated with a principal.

In some embodiments, a principal is a cloud entity which includes a permission, authorization, and the like, to act on a resource, initiate an action in the computing environment, a combination thereof, and the like.

In certain embodiments, a resource is a virtual machine, a software container, a serverless function, an application, a software as a service, an infrastructure as code platform, a provisioned hardware resource, a storage, a bucket in a cloud computing environment, a combination thereof, and the like.

At S1010, a cybersecurity object is detected. In an embodiment, the cybersecurity object is detected on a deployed virtualization. A deployed virtualization is, according to an embodiment, a virtual machine, a software container, a serverless function, a combination thereof, and the like.

In some embodiments, a cybersecurity object is an operating system, a software application, a cleartext password, a plaintext password, an encryption key, a certificate, a misconfiguration, a vulnerability, an exposure, a combination thereof, and the like.

In an embodiment, the cybersecurity object is detected utilizing a scanner, an inspector, and the like. In certain embodiments, a representation of the cybersecurity object is stored on a security graph. In an embodiment, the security graph includes a representation of a computing environment, for example, by generating nodes which represent resources, principals, enrichments, and the like, detected in the computing environment.

In some embodiments, detection of resources, principals, and the like, is performed by utilizing network discovery. In an embodiment, a node representing a cybersecurity object is connected to a node representing a cloud entity (e.g., a resource, a principal, and the like). In some embodiments, the security graph is traversed to detect a node representing a resource, based on the cybersecurity object. For example, an identifier of the cybersecurity object is utilized to generate a query for the security graph.

At S1020, a policy is detected. In an embodiment, the policy is applied to the computing environment in which the cybersecurity object is detected. In some embodiments, the policy is detected by extracting an identifier of the cybersecurity object, and matching the identifier to a policy. In an embodiment, matching the identifier to a policy is performed by querying an identity and access management service.

In some embodiments, a policy is detected based on an identifier of a resource on which the cybersecurity object is detected. For example, in an embodiment, data pertaining to the resource, metadata of the resource, and the like, is utilized to detect a policy. For example, in an embodiment, an identifier of a resource is utilized to detect a policy. In certain embodiments, a policy engine is queried with the identifier to detect a policy.

At S1030, a contextual policy is generated. In an embodiment, a contextual policy is generated based on an applied policy and the cybersecurity object. In certain embodiments, a contextual policy is generated based on the applied policy and an exception generated based on the cybersecurity object. In some embodiments, the applied policy includes a rule, such that the contextual policy includes the rule which is applied other than in instances where the exception is true (e.g., a condition of the exception is true).

In certain embodiments, the exception is exclusionary, while in other embodiments the exception is inclusionary. According to an embodiment, an exception is exclusionary where the applied policy is applied to all instances, other than instances where a condition of the exception is true.

In some embodiments, the exception is inclusionary, such that the exception is applied to some instances, and applied to another instance to which the applied policy would not apply if not for the exception condition.

For example, in an embodiment, a rule includes a condition that no container can be deployed with a cleartext password (a cybersecurity object). In an embodiment, a first cleartext password provides administrator privileges, while a second cleartext password provides limited privileges. Therefore, a contextual policy is generated based on the rule (e.g., no container deployed with a cleartext password) and an exception (e.g., cleartext passwords with limited privilege).

In an embodiment, the second cleartext password is detected on a deployed workload. In some embodiments, a security graph, identity and access management service, and the like, is queried to determine a permission associated with the second cleartext password. In an embodiment, where the second cleartext password is associated with limited permissions (i.e., not administrator permissions), an exception is generated to the policy rule which states that no container can be deployed with a cleartext password.

At S1040, an admission controller is configured to apply the contextual policy. In an embodiment, the admission controller is configured to periodically request policies, rules, exceptions, and the like. In some embodiments, the admission controller applies the contextual rule prior to deploying a software container in the software container cluster. In certain embodiments, the admission controller is configured to apply the contextual rule to each request sent to a software container in the software container cluster. In an embodiment, the admission controller is configured to apply the contextual rule to each communication directed to a software container in the software container cluster.

In some embodiments, the contextual policy is generated by a unified policy engine, and sent from the unified policy engine to each of a plurality of admission controllers, each admission controller deployed in a software container cluster of a plurality of software container clusters. In certain embodiments, each software container cluster of the plurality of software container clusters is deployed in a different cloud computing environment. In an embodiment, each cloud computing environment is deployed on a different cloud computing infrastructure.

For example, according to an embodiment a first software container cluster is deployed in a first cloud computing environment (e.g., a virtual private cloud—VPC), the first cloud computing environment deployed on Amazon® Web Services (AWS), and a second software container cluster is deployed in a second cloud computing environment (e.g., a virtual network—VNet), the second cloud computing environment deployed on Microsoft® Azure.

Figure 11:
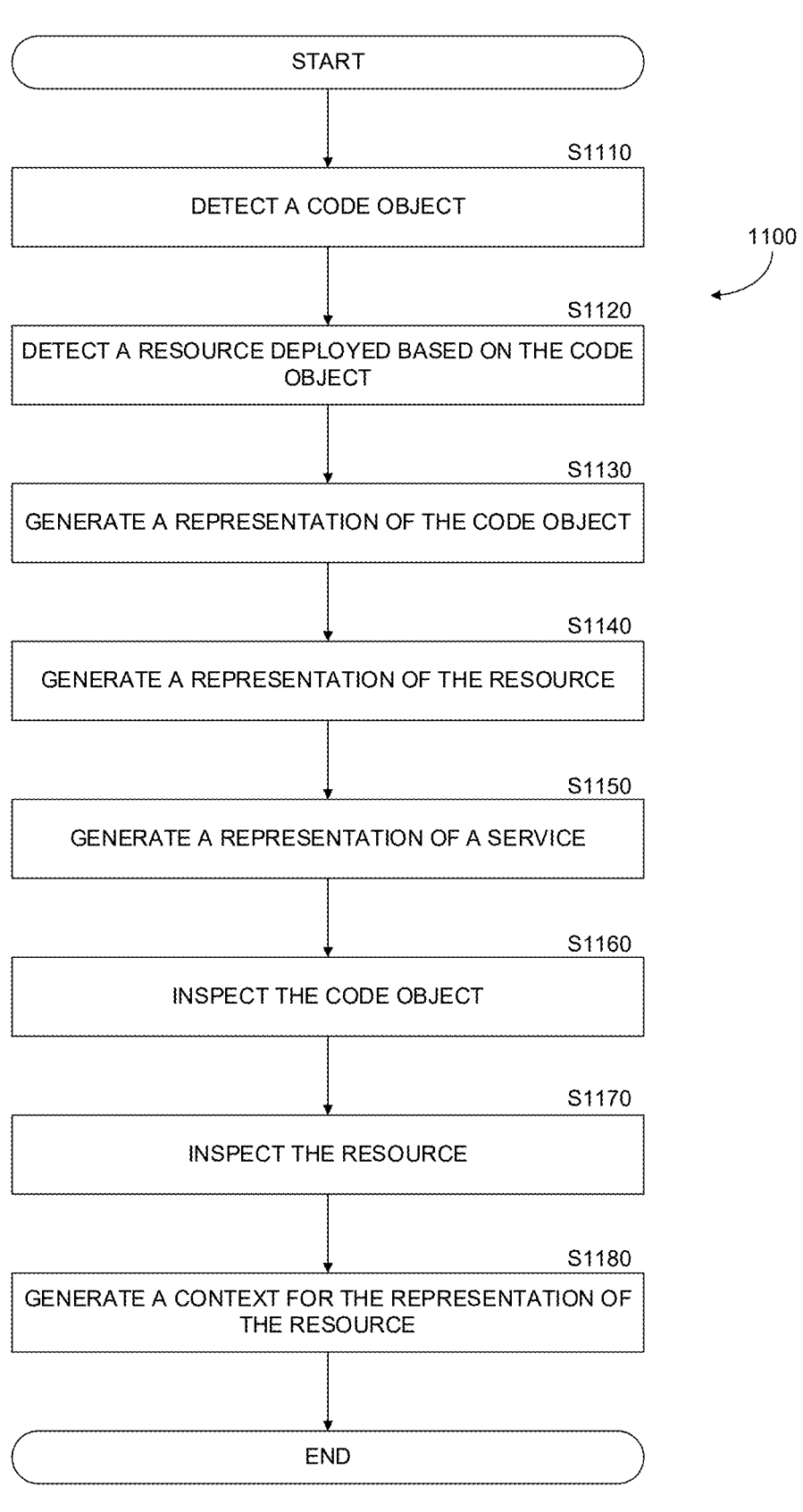
FIG. 11 is an example flowchart of a method for software service discovery in a computing environment, implemented in accordance with an embodiment.

FIG. 11 is an example flowchart 1100 of a method for service discovery in a computing environment, implemented in accordance with an embodiment.

At S1110, a code object is detected. In an embodiment, a code object is detected in a computing environment. In some embodiments, a code object includes a secret (such as a public key, a private key, etc.), resource type, a policy identifier, a role identifier, a status of a flag, a combination thereof, and the like.

In certain embodiments, a computing environment is a cloud computing environment. In an embodiment, a cloud computing environment is a virtual private cloud (VPC), a virtual network (VNET), and the like, implemented on a cloud computing infrastructure.

According to an embodiment, a cloud computing infrastructure is, for example, Amazon® Web Services (AWS), Microsoft® Azure, Google® Cloud Platform (GCP), and the like. In an embodiment, the code object is a portion of declaratory code.

In some embodiments, the declaratory code is in a declaratory computer language, which an orchestrator (e.g., as in FIG. 1) is configured to deploy instances in the cloud environment based on the declarations in the declaratory code.

According to an embodiment, a code object is detected utilizing static analysis techniques, by accessing a code repository, accessing a file including computer code, accessing a command line interface (CLI), a combination thereof, and the like.

At S1120, a resource is detected. In some embodiments, the resource is deployed based on the code object. In an embodiment, a resource is deployed in the computing environment based on a detected code object. In an example embodiment, a code object includes an object type (FIGS. 4, 410) which indicates that this code object is a resource type, i.e., executing instructions related to this code object will result in deploying a resource in a cloud computing environment.

In this example embodiment, the code object is a data structure having parameters (e.g., data fields) which are customized with data values to generate entities such as resources, accounts, and the like, in a cloud computing environment.

In an embodiment, a resource is detected utilizing a network discovery technique. For example, in some embodiments, discovering a resource in a network, for example of a computing environment, includes determining an IP range utilized by resources in the network and sending a PING, SYN, etc., instruction, which is used to determine presence of a resource based on a response.

In some embodiments, a resource is detected in a computing environment, such as a cloud computing environment, by querying an API of the computing environment to discover what resources are deployed therein.

At S1130, a representation of the code object is generated. In an embodiment, a representation of the code object is generated in a security database. In an embodiment, a security database further includes a representation of the computing environment.

In an embodiment, the representation is generated based on a unified data schema, which includes a predefined template, data structure, and the like, which is utilized to represent the code object. For example, in some embodiments, the security database is implemented as a graph database, such as Neo4j®, and is stored based on a graph schema, including different nodes, edges, etc.

At S1140, a representation of the resource is generated. In certain embodiments, a representation of the resource is generated in the security database. In an embodiment, the representation of the resource is connected to the representation of the code object.

In some embodiments, the representation of the code object is connected to a plurality of nodes, each node representing a resource which is deployed based on the same code object.

For example, in an embodiment, a plurality of nodes of a software container are deployed based on a single image, such that the single image is the code object, and the plurality of nodes are each a resource of a plurality of resources. In such an embodiment, the single image is represented by a node in a security graph, and the node is connected to a plurality of nodes, each node of the plurality of nodes representing a node of software container.

At 1150, a representation of a service is generated. In an embodiment, the representation of a service is generated in a security base. In some embodiments, the representation of the service is connected to the representation of the code object and the representation of the resource.

In an embodiment, the representation of the service is connected in the security database to a representation of a dependent component (e.g., a resource such as a database, a messaging queue, and the like), a representation of a software artifact, a representation of a repository, a representation of a deployed instance, a representation of a code object, various combinations thereof, and the like.

In an embodiment, a representation of a service is connected to a representation of a service instance. In some embodiments, a service is utilized in multiple computing environments, for example a Kubernetes cluster which is deployed in both a staging environment and a production environment. In such an embodiment, a service is represented in the security database, which is connected to a first representation of a service instance (e.g., the cluster deployed in the staging environment) and connected to a second representation of the service instance (e.g., the cluster deployed in the production environment).

At 1160, the code object is inspected. In an example, the code object is inspected for a first cybersecurity object. In some embodiments, the cybersecurity object is an identity object, a file, a folder, a filesystem, a software application, a software library, a software binary, a cryptographic key, a certificate, a password, a code object, a software call, a malware object, a combination thereof, and the like.

In certain embodiments, an inspector, such as discussed in more detail in FIG. 1 above, is configured to inspect a code object, for example by reading a code file and parsing the code into data fields, extracting values of the data fields, and comparing the extracted values to preexisting values, value types, etc.

At 1170, the resource is inspected. For example, the resource is inspected for a second cybersecurity object. In an embodiment, inspecting a resource includes utilizing static analysis techniques. According to certain embodiments, inspecting a resource includes detecting a disk associated with the resource, such as a disk provisioned, assigned, etc., to the resource.

In an embodiment, an inspectable disk is generated based on the detected disk of the resource. In some embodiments, the inspectable disk is generated based on a clone, a snapshot, a copy, and the like, of the original disk. In certain embodiments, it is advantageous to generate a cloned disk as the inspectable disk, as the clone is available instantaneously, while a snapshot for example, requires that the entire snapshot data is written prior to the snapshot being accessible for inspection.

At 1180, a context is generated. In an embodiment, the context is generated for the representation of the service. In certain embodiments, a context for the representation of the service is generated based on a first result of inspecting the code object and a second result of inspecting the resource. In an embodiment, a context includes a build time, a code commit, a security testing result, an enforced policy, a policy exception, a list of service instance identifiers, an identifier version per service instance, a combination thereof, and the like.

In an embodiment, context includes a service owner, a risk level associated with the software service, a risk level associated with a component of the service, additional properties (e.g. SLA on bug fixes), security contact for the service, source of code for the service, etc.

In certain embodiments, the context further includes principal information, such as principals that access the service, principals that act on the service, principals which are utilized by the service, principals which are utilized by components of the service, a combination thereof, and the like.

Figure 12:
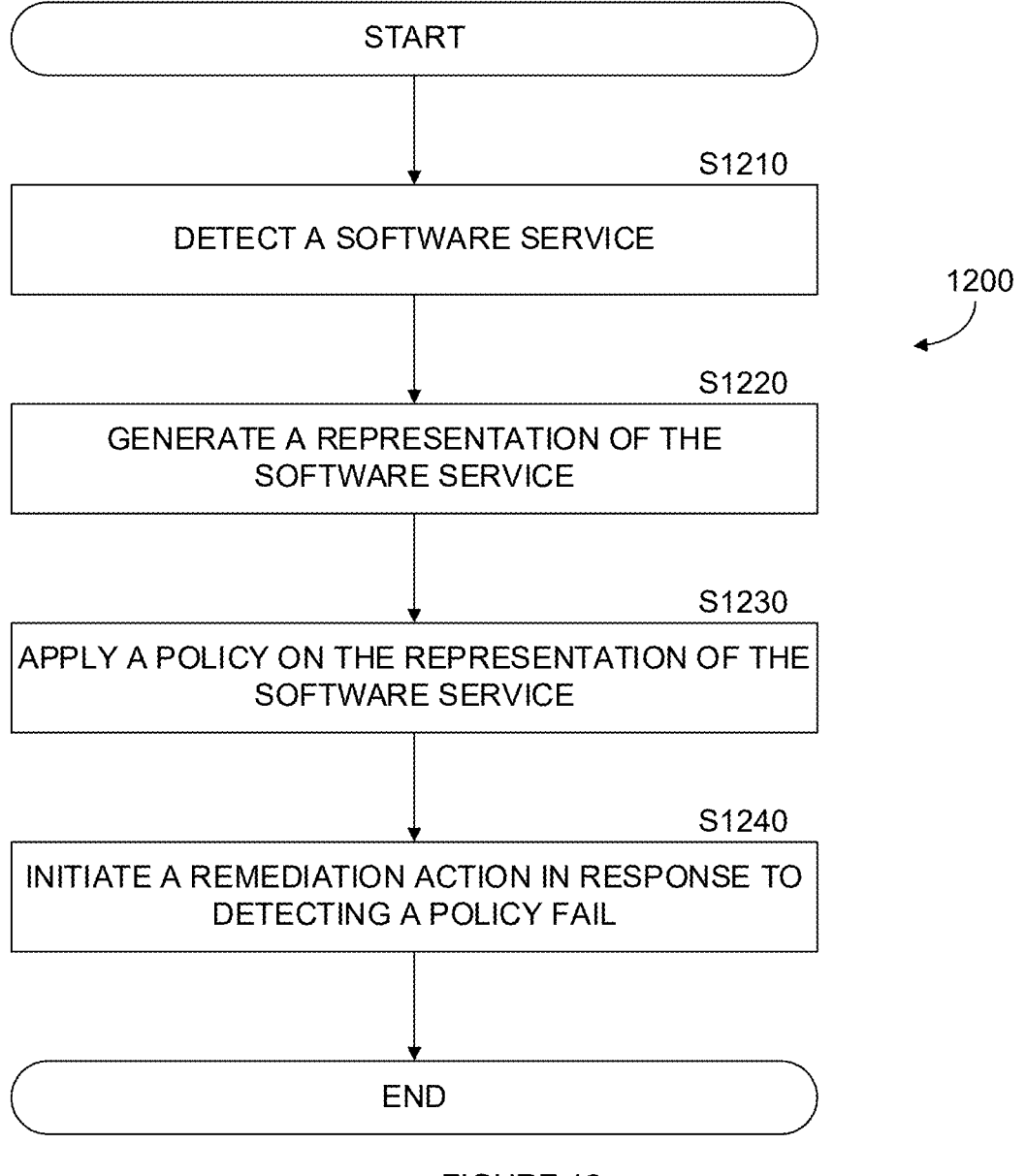
FIG. 12 is an example flowchart of a method for cyber-security policy enforcement on a service in a computing environment, implemented in accordance with an embodiment.

FIG. 12 is an example flowchart 1200 of a method for cybersecurity policy enforcement on a service in a computing environment, according to an embodiment. In an embodiment, a policy is enforced on a service, on a service instance, on a plurality of service instances, on a combination thereof, and the like.

At S1210, a software service is detected. In an embodiment, a software service is detected in a computing environment. In certain embodiments, the software service includes a code object and a resource. In some embodiments, the software service is detected based on the methods described in more detail herein.

In an embodiment, a computing environment includes a cloud computing environment, a registry, a repository, a CI/CD environment, a CLI environment, various combinations thereof, and the like. In certain embodiments, each component of the computing environment is inspected, for example utilizing static analysis, runtime data (e.g., utilizing a sensor deployed on a workload), a combination thereof, and the like, to detect cybersecurity objects.

In some embodiments, a service is detected based on detection of a code object which is utilized to deploy a plurality of resources, software artifacts, forensic artifacts, events in a cloud log, a combination thereof, and the like.

At S1220, a representation of the software service is generated. In some embodiments, a representation of the software service is generated in a security database. In certain embodiments, the security database further includes a representation of the computing environment.

In an embodiment, the representation of the software service is connected to a representation of an instance of software service. For example, according to certain embodiments, a plurality of instances of the software service are deployed across different computing environments, such as a production environment, a staging environment, a testing environment, etc.

At S1230, a policy is applied on the representation of the software service. In some embodiments the policy includes a conditional rule. In an embodiment, applying a policy on a representation of the software service includes providing the policy, the conditional rule, the representation of the software service, and the like, to a policy engine. In an embodiment, the policy engine is configured to apply the rule, for example by determining if the conditional rule is satisfied (e.g., is 'true').

For example, according to an embodiment, a conditional rule checks that a database application is password protected. In an embodiment, the representation of the database, which is a component of the software service, is connected to a representation of the service. In certain embodiments, the policy is applied to the representation of the database, which does not include a password. Therefore, the conditional rule, when applied to the representation of the database, results in a fail (or 'false) result.

At S1240, a remediation action is initiated in response to detecting a policy fail. In some embodiments, a remediation action is initiated. In an embodiment, the remediation action is initiated in response to detecting a policy fail when applying the policy on the representation of the software service.

According to an embodiment, the remediation action includes initiating a remediation action on each component of the software service, on a portion of components of the software service, on single component of the software service, and the like.

In an embodiment, the remediation action is initiated only on a component which caused the software service to fail the policy. In certain embodiments, the remediation action includes updating a software, installing a software patch, revoking access to a resource, revoking access from a resource, revoking access to a principal, revoking access from a principal, generating an alert, updating a severity of an alert, generating a support ticket, updating a severity of a ticket, a combination thereof, and the like.

In some embodiments, the remediation action is initiated on each instance of the software service. According to some embodiments, the remediation action is initiated on each instance of the software service which corresponds to a specific version number. In some embodiments, a first remediation action is initiated in a first computing environment, and a second remediation action is initiated in a second computing environment.

Figure 13:
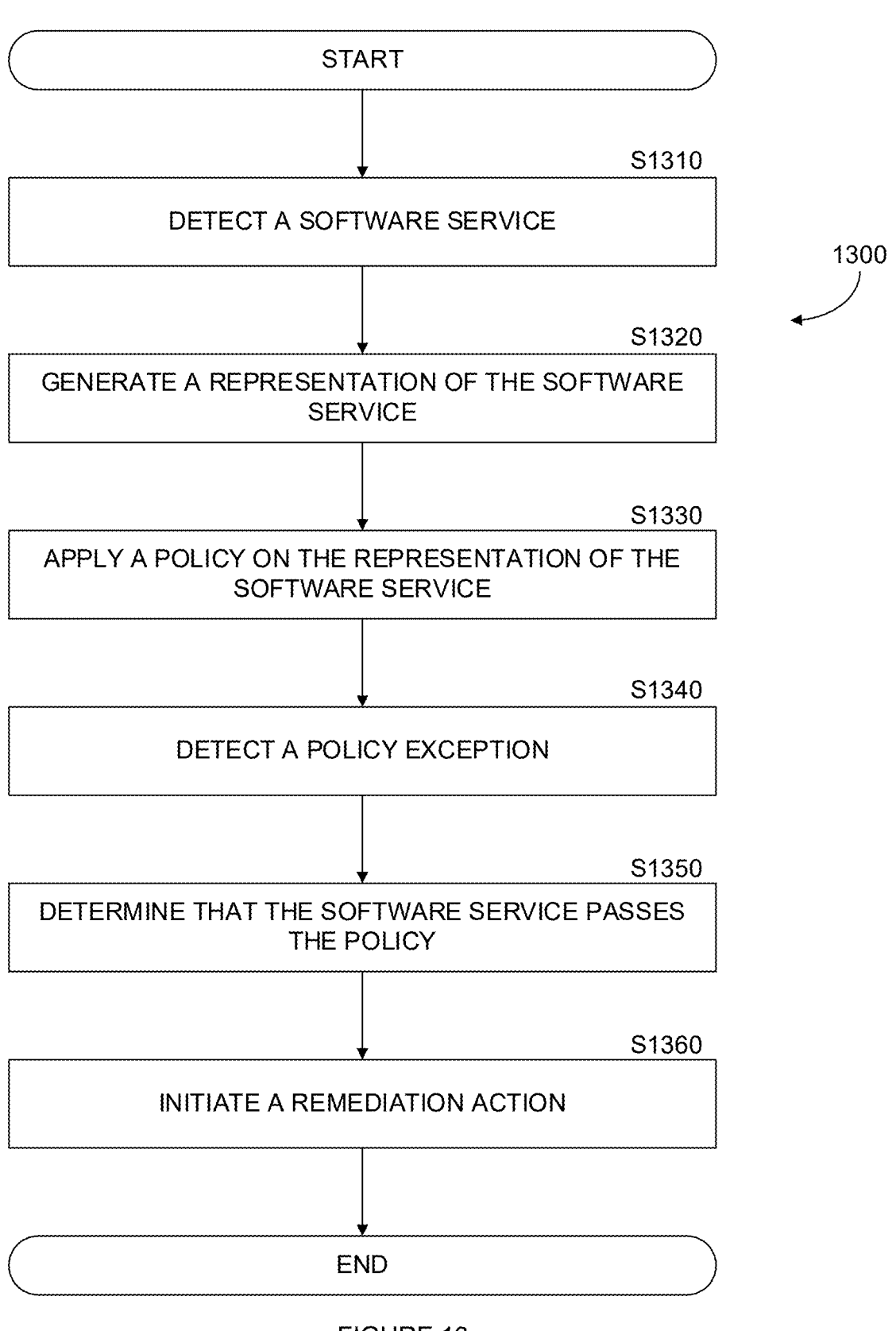
FIG. 13 is an example flowchart of a method for managing a cybersecurity policy exception on a software service in a computing environment, implemented in accordance with an embodiment.

FIG. 13 is an example flowchart 1300 of a method for managing a cybersecurity policy exception on a software service in a computing environment, according to an embodiment.

At S1310, a software service is detected. In some embodiments, a software service is detected in a computing environment. In some embodiments, the software service includes a code object and a resource. In an embodiment, a software service is detected in a computing environment. In certain embodiments, the software service includes a code object and a resource. In some embodiments, the software service is detected based on the methods described in more detail herein.

In an embodiment, a computing environment includes a cloud computing environment, a registry, a repository, a CI/CD environment, a CLI environment, various combinations thereof, and the like. In certain embodiments, each component of the computing environment is inspected, for example utilizing static analysis, runtime data (e.g., utilizing a sensor deployed on a workload), a combination thereof, and the like, to detect cybersecurity objects.

In some embodiments, a service is detected based on detection of a code object which is utilized to deploy a plurality of resources, software artifacts, forensic artifacts, events in a cloud log, a combination thereof, and the like.

At S1320 a representation of the software service is generated. In some embodiments, the representation of a software service is generated in a security database. In an embodiment, the security database includes a representation of the computing environment.

In an embodiment, the representation of the software service is connected to a representation of an instance of software service. For example, according to certain embodiments, a plurality of instances of the software service are deployed across different computing environments, such as a production environment, a staging environment, a testing environment, etc.

At S1330, a policy is applied on the representation of the software service. In some embodiments, a policy includes a conditional rule. In an embodiment, applying a policy on a representation of the software service includes providing the policy, the conditional rule, the representation of the software service, and the like, to a policy engine. In an embodiment, the policy engine is configured to apply the rule, for example by determining if the conditional rule is satisfied (e.g., is 'true').

For example, according to an embodiment, a conditional rule checks that a database application is password protected. In an embodiment, the representation of the database, which is a component of the software service, is connected to a representation of the service. In certain embodiments, the policy is applied to the representation of the database, which does not include a password. Therefore, the conditional rule, when applied to the representation of the database, results in a fail (or 'false) result.

At S1340, a policy exception is detected. In some embodiments, a policy exception is detected in response to applying the policy resulting in a policy fail of the conditional rule.

In an embodiment, a policy exception is based on an identifier of a resource, an identifier of a software service, an identifier of an instance of the software service, an identifier of the computing environment in which the resource, the software service, and the like is deployed, various combinations thereof, and the like.

At S1350, it is determined that the software service passes the policy. In certain embodiments, it is determined that the software service passes the policy in response to applying the policy exception resulting in a pass. In an embodiment, applying an exception to the policy is applied across all software service instances, and for each component thereof.

According to an embodiment, applying a policy exception in this manner allows to generate a single exception which is applied to each software service instance, each component thereof, and each computing environment in which the software service is deployed. This is advantageous, in an embodiment, as it reduces the amount of policies utilized for a computing environment, and further eliminates the possibility of an exception mismatch, such that an exception would be applied with one policy, but not with another corresponding policy, where multiple policies would otherwise be utilized.

At S1360, a remediation action is initiated. In some embodiments, a remediation action is generated in response to determining that applying the policy exception results in a policy fail.

According to an embodiment, the remediation action includes initiating a remediation action on each component of the software service, on a portion of components of the software service, on single component of the software service, and the like.

In an embodiment, the remediation action is initiated only on a component which caused the software service to fail the policy. In certain embodiments, the remediation action includes updating a software, installing a software patch, revoking access to a resource, revoking access from a resource, revoking access to a principal, revoking access from a principal, generating an alert, updating a severity of an alert, generating a support ticket, updating a severity of a ticket, a combination thereof, and the like.

In some embodiments, the remediation action is initiated on each instance of the software service. According to some embodiments, the remediation action is initiated on each instance of the software service which corresponds to a specific version number. In some embodiments, a first remediation action is initiated in a first computing environment, and a second remediation action is initiated in a second computing environment.

Figure 14:
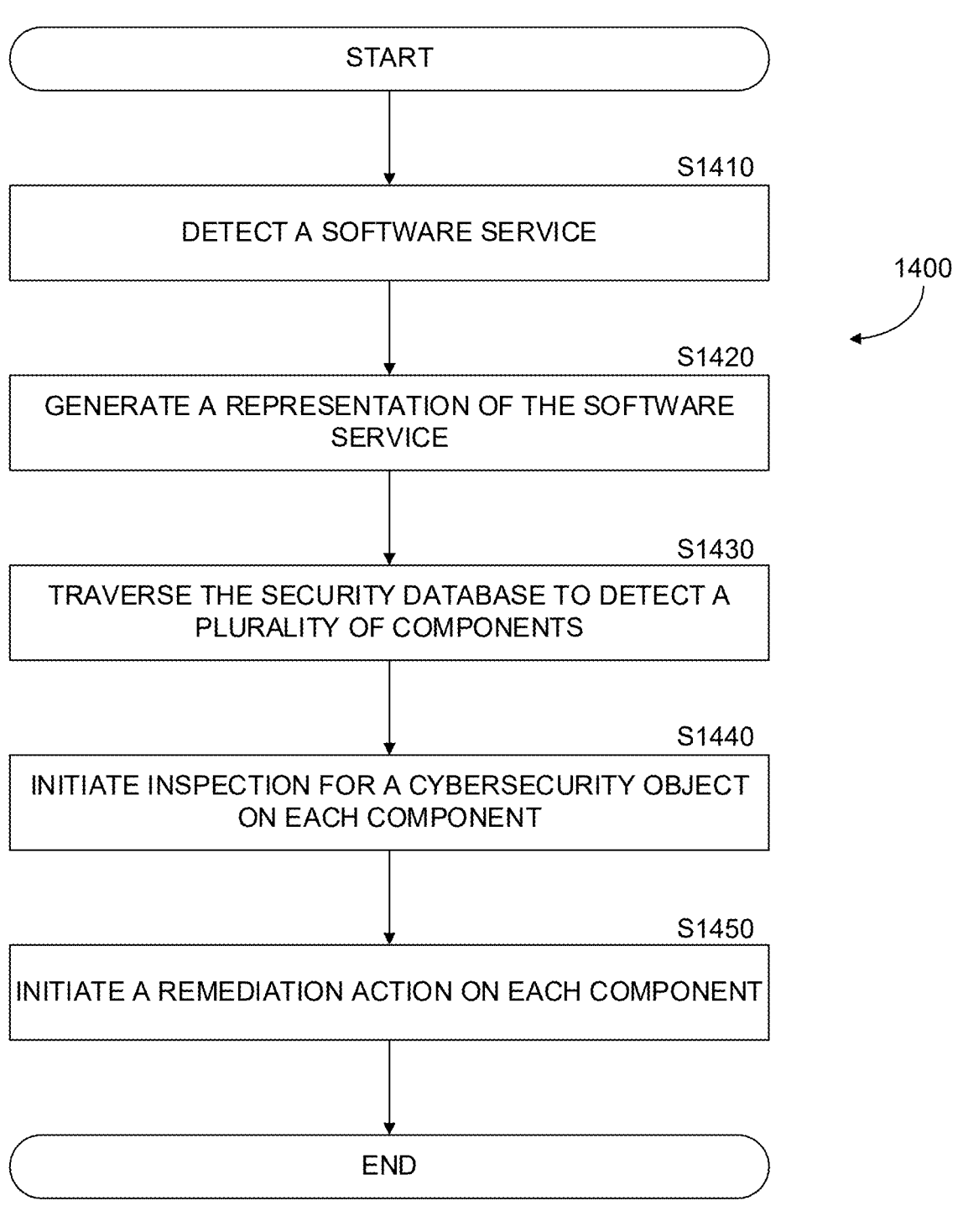
FIG. 14 is an example flowchart of a method for initiating a remediation action on a software service in a computing environment, implemented in accordance with an embodiment.

FIG. 14 is an example flowchart 1400 of a method for initiating a remediation action on a software service in a computing environment, according to an embodiment.

At S1410, a software service is detected. In some embodiments, a software service is detected in a computing environment. In certain embodiments, the software service includes a code object and a resource. In an embodiment, a software service is detected in a computing environment. In certain embodiments, the software service includes a code object and a resource. In some embodiments, the software service is detected based on the methods described in more detail herein.

In an embodiment, a computing environment includes a cloud computing environment, a registry, a repository, a CI/CD environment, a CLI environment, various combinations thereof, and the like. In certain embodiments, each component of the computing environment is inspected, for example utilizing static analysis, runtime data (e.g., utilizing a sensor deployed on a workload), a combination thereof, and the like, to detect cybersecurity objects.

In some embodiments, a service is detected based on detection of a code object which is utilized to deploy a plurality of resources, software artifacts, forensic artifacts, events in a cloud log, a combination thereof, and the like.

At S1420, a representation of the software service is generated. In some embodiments, a representation of the software service is generated in a security database. In certain embodiments, the security database further includes a representation of the computing environment.

In an embodiment, the representation of the software service is connected to a representation of an instance of software service. For example, according to certain embodiments, a plurality of instances of the software service are deployed across different computing environments, such as a production environment, a staging environment, a testing environment, etc.

At S1430, a plurality of components is detected. In an embodiment, a security database is traversed, queried, and the like, to detect the plurality of components. In some embodiments, each component of a plurality of components have a representation connected to the representation of the software service.

In an embodiment, a first group of components of the plurality of components are associated with a first instance of the software service, and a second group of components of the plurality of components are associated with a second instance of the software service.

At S1440, inspection is initiated for a cybersecurity object on each component. In some embodiments, inspection is initiated on each component of the software service for detecting a cybersecurity object.

In an embodiment, inspecting a component of a software service includes generating a clone, a copy, a snapshot, and the like. In some embodiments, an inspectable disk is generated for inspection, which is inspected instead of the original disk, allowing the original disk to remain unperturbed. This is particularly advantageous, in an embodiment, in a production environment.

In some embodiments, inspecting a resource includes utilizing static analysis techniques. According to certain embodiments, inspecting a resource includes detecting a disk associated with the resource, such as a disk provisioned, assigned, etc., to the resource.

In an embodiment, an inspectable disk is generated based on the detected disk of the resource. In some embodiments, the inspectable disk is generated based on a clone, a snapshot, a copy, and the like, of the original disk. In certain embodiments, it is advantageous to generate a cloned disk as the inspectable disk, as the clone is available instantaneously, while a snapshot for example, requires that the entire snapshot data is written prior to the snapshot being accessible for inspection.

At S1450, a remediation action is initiated. In an embodiment, the remediation action is initiated on each component of a software service. In some embodiments, a remediation action is initiated on each component of the software service on which the cybersecurity object is detected.

In an embodiment, the remediation action is initiated only on a component which caused the software service to fail the policy. In certain embodiments, the remediation action includes updating a software, installing a software patch, revoking access to a resource, revoking access from a resource, revoking access to a principal, revoking access from a principal, generating an alert, updating a severity of an alert, generating a support ticket, updating a severity of a ticket, a combination thereof, and the like.

In some embodiments, the remediation action is initiated on each instance of the software service. According to some embodiments, the remediation action is initiated on each instance of the software service which corresponds to a specific version number. In some embodiments, a first remediation action is initiated in a first computing environment, and a second remediation action is initiated in a second computing environment.

Figure 15:
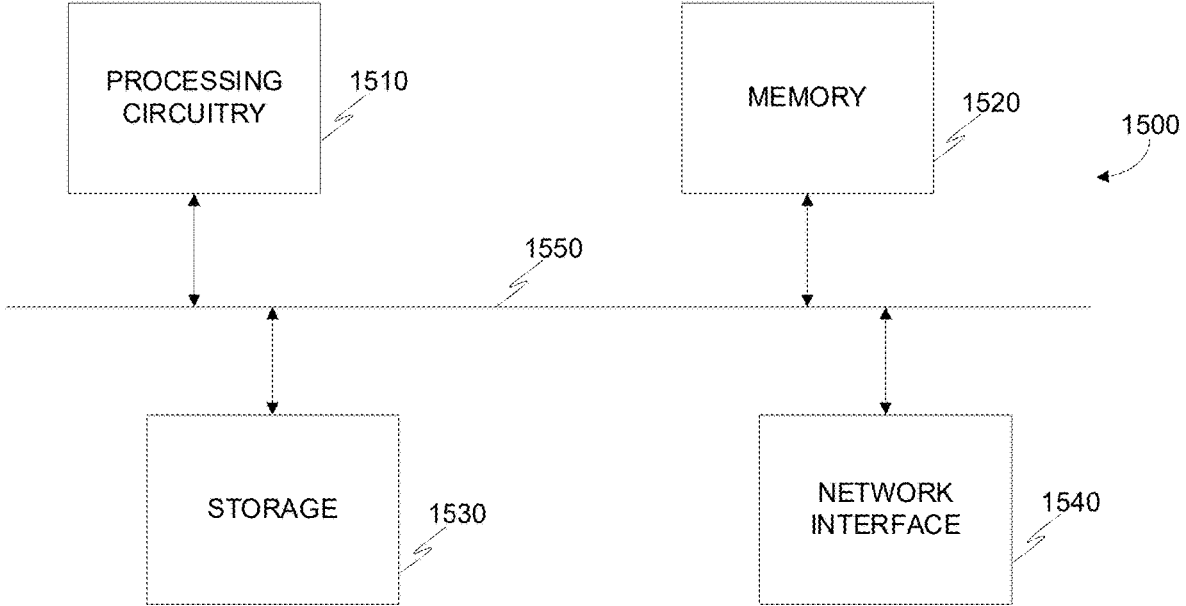
FIG. 15 is an example schematic diagram of a unified policy engine according to an embodiment.

FIG. 15 is an example schematic diagram 1500 of a policy engine 190 according to an embodiment. The policy engine 190 includes a processing circuitry 1510 coupled to a memory 1520, a storage 1530, and a network interface 1540. In an embodiment, the components of the policy engine 190 may be communicatively connected via a bus 1550.

The processing circuitry 1510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 1520 may be volatile (e.g., random access memory, etc.), non-volatile (e.g., read only memory, flash memory, etc.), or a combination thereof. In an embodiment, the memory 1520 is an on-chip memory, an off-chip memory, a combination thereof, and the like. In certain embodiments, the memory 1520 is a scratch-pad memory for the processing circuitry 1510.

In one configuration, software for implementing one or more embodiments disclosed herein may be stored in the storage 1530, in the memory 1520, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 1510, cause the processing circuitry 1510 to perform the various processes described herein.

The storage 1530 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 1540 is configured to provide the policy engine 190 with communication with, for example, the inspection API 740, the software container cluster 710, and the like.

It should be understood that the embodiments described herein are not limited to the specific architecture illustrated in FIG. 15, and other architectures may be equally used without departing from the scope of the disclosed embodiments.

Furthermore, in certain embodiments the software container cluster 710 may be implemented with the architecture illustrated in FIG. 15. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for managing a cybersecurity policy exception on a software service in a computing environment, comprising:

detecting the software service in the computing environment, the software service including a code object and a resource;

generating a representation of the software service in a security database as a portion of a security graph, wherein the representation of the software service is connected to a representation of the code object and a representation of the resource, wherein the representation of the code object, the representation of the software service, and the representation of the resource are nodes of the security graph, and wherein the security database further including a representation of the computing environment in the security graph;

applying a policy on the representation of the software service, the policy including a conditional rule;

detecting a policy exception in response to applying the policy resulting in a policy fail of the conditional rule;

determining that the software service passes the policy in response to applying the policy exception resulting in a pass; and initiating a remediation action, in response to determining that applying the policy exception results in a policy fail.

2. The method of claim 1, further comprising:

applying the policy exception only in response to determining that the applied policy on the representation of the software service results in a fail of the conditional rule.

3. The method of claim 1, further comprising:

generating the policy exception in response to applying the policy resulting in a policy fail of the conditional rule.

4. The method of claim 1, further comprising:

applying the policy exception to each representation of a component of the software service.

5. The method of claim 4, further comprising:

determining that the software service fails the policy, in response to determining that a representation of a first component of the software service passes the policy exception, and a representation of a second component of the software service fails the policy exception.

6. The method of claim 5, further comprising:

initiating the remediation action on the second component of the software service.

7. The method of claim 1, further comprising:

initiating the remediation action on each component of the software service.

8. The method of claim 1, further comprising:

applying the policy exception on each component of the software service.

9. The method of claim 1, further comprising:

applying the policy exception on each of a plurality of software services, in response to determining that the plurality of software services are similar to the software service.

10. A non-transitory computer-readable medium storing a set of instructions for managing a cybersecurity policy exception on a software service in a computing environment, the set of instructions comprising:

one or more instructions that, when executed by one or more processing circuitries of a device, cause the device to:

detect the software service in the computing environment, the software service including a code object and a resource;

generate a representation of the software service in a security database as a portion of a security graph, wherein the representation of the software service is connected to a representation of the code object and a representation of the resource, wherein the representation of the code object, the representation of the software service, and the representation of the resource are nodes of the security graph, and wherein the security database further including a representation of the computing environment in the security graph;

apply a policy on the representation of the software service, the policy including a conditional rule;

detect a policy exception in response to applying the policy resulting in a policy fail of the conditional rule;

determine that the software service passes the policy in response to applying the policy exception resulting in a pass; and initiate a remediation action, in response to determining that applying the policy exception results in a policy fail.

11. A system for managing a cybersecurity policy exception on a software service in a computing environment comprising:

a processing circuitry;

a memory, the memory containing instructions that, when executed by the processing circuitry, configure the system to:

detect the software service in the computing environment, the software service including a code object and a resource;

generate a representation of the software service in a security database as a portion of a security graph, wherein the representation of the software service is connected to a representation of the code object and a representation of the resource, wherein the representation of the code object, the representation of the software service, and the representation of the resource are nodes of the security graph, and wherein the security database further including a representation of the computing environment in the security graph;

apply a policy on the representation of the software service, the policy including a conditional rule;

detect a policy exception in response to applying the policy resulting in a policy fail of the conditional rule;

determine that the software service passes the policy in response to applying the policy exception resulting in a pass; and initiate a remediation action, in response to determining that applying the policy exception results in a policy fail.

12. The system of claim 11, wherein the memory contains further instructions which, when executed by the processing circuitry, further configure the system to:

apply the policy exception only in response to determining that the applied policy on the representation of the software service results in a fail of the conditional rule.

13. The system of claim 11, wherein the memory contains further instructions which, when executed by the processing circuitry, further configure the system to:

generate the policy exception in response to applying the policy resulting in a policy fail of the conditional rule.

14. The system of claim 11, wherein the memory contains further instructions which, when executed by the processing circuitry, further configure the system to:

apply the policy exception to each representation of a component of the software service.

15. The system of claim 14, wherein the memory contains further instructions which, when executed by the processing circuitry, further configure the system to:

one or more processors are further configured to:

determine that the software service fails the policy, in response to determining that a representation of a first component of the software service passes the policy exception, and a representation of a second component of the software service fails the policy exception.

16. The system of claim 15, wherein the memory contains further instructions which, when executed by the processing circuitry, further configure the system:

initiate the remediation action on the second component of the software service.

17. The system of claim 11, wherein the memory contains further instructions which, when executed by the processing circuitry, further configure the system to:

initiate the remediation action on each component of the software service.

18. The system of claim 11, wherein the memory contains further instructions which, when executed by the processing circuitry, further configure the system to:

apply the policy exception on each component of the software service.

19. The system of claim 11, wherein the memory contains further instructions which, when executed by the processing circuitry, further configure the system to:

apply the policy exception on each of a plurality of software services, in response to determining that the plurality of software services are similar to the software service.

\* \* \* \* \*